United States Patent [19]

Laney

[11] Patent Number: 5,668,932

[45] Date of Patent: *Sep. 16, 1997

[54] DIGITAL VIDEO DATA COMPRESSION TECHNIQUE

[75] Inventor: Stuart T. Laney, Seattle, Wash.

[73] Assignee: Microsoft Corporation, Redmond, Wash.

[*] Notice: The term of this patent shall not extend beyond the expiration date of Pat. No. 5,544,286.

[21] Appl. No.: 647,366

[22] Filed: May 9, 1996

Related U.S. Application Data

[63] Continuation of Ser. No. 11,317, Jan. 29, 1993, Pat. No. 5,544,286.
[51] Int. Cl.[6] .................................................. G06F 15/00
[52] U.S. Cl. ............................................ 395/109; 358/466
[58] Field of Search .................................. 395/100, 101, 395/109, 131; 358/261.1, 261.2, 261.3, 426, 466; 382/232, 233, 236, 244, 245, 248, 252, 166

[56] References Cited

U.S. PATENT DOCUMENTS

| | | | |
|---|---|---|---|
| 4,710,811 | 12/1987 | Kondo | 358/135 |
| 4,743,959 | 5/1988 | Frederiksen | 358/11 |
| 4,953,023 | 8/1990 | Kondo | 358/135 |
| 5,041,916 | 8/1991 | Yoshida et al. | 358/433 |
| 5,046,119 | 9/1991 | Hoffert et al. | 382/56 |
| 5,047,853 | 9/1991 | Hoffert et al. | 358/133 |
| 5,353,061 | 10/1994 | Rodriquez et al. | 348/409 |
| 5,544,286 | 8/1996 | Lahey | 395/114 |

*Primary Examiner*—Thomas D. Lee
*Assistant Examiner*—Gabriel I. Garcia
*Attorney, Agent, or Firm*—Seed and Berry LLP

[57] ABSTRACT

A technique for compressing digital video data provides improved compression over conventional block compression techniques. In this technique, image data is broken down into cells and iteratively compressed. The cells are compressed using compression formats that are most appropriate for the contents of the cells. A determination is first made whether a cell is substantially identical to a succeeding cell in a previous frame. If the cell is substantially identical to the cell in the previous frame, the cell is encoded in compressed form as a duplicate of the previous cell. Moreover, solid-color compression approaches, two-color compression approaches and eight-color compression approaches may be integrated into the compression technique.

20 Claims, 26 Drawing Sheets

|   |   |   |   |
|---|---|---|---|
| 0 | 1 | 2 | 3 |
| 4 | 5 | 6 | 7 |
| 8 | 9 | A | B |
| C | D | E | F |

*Figure 9*

DIGITAL VIDEO DATA COMPRESSION TECHNIQUE

CROSS-REFERENCE TO RELATED APPLICATION

This application is a continuation of U.S. patent application Ser. No. 08/011,317, filed Jan. 29, 1993, now U.S. Pat. No. 5,544,286.

TECHNICAL FIELD

The present invention relates generally to data processing systems and, more particularly, to a digital video data compression technique.

BACKGROUND OF THE INVENTION

Many different classes of digital video data compression techniques are used to compress digital video data. Block compression techniques are a class of techniques which compress digital video data on a block-by-block basis. A block (also known as a "cell") refers to a fixed-size group of pixels. A cell is typically formed by a two-dimensional symmetric group of pixels, such as two pixels by two pixels, four pixels by four pixels or sixteen pixels by sixteen pixels. Block compression techniques seek to compress the non-compressed color data that is provided for each of the pixels of a cell. The non-compressed color data of a pixel typically encodes red component information, green component information and blue component information for the pixel.

FIG. 1 shows a flowchart of the steps performed by one conventional block compression technique. In this technique, each frame of image data is divided into cells of four pixels by four pixels. The cells are compressed by an iterative procedure until all of the cells in the image have been compressed. In accordance with this iterative procedure, before compressing each cell in the image, the technique checks whether compression is complete for the frame by determining if any cells remain to be compressed (step 10). If no cells remain to be compressed, the compression of the frame is complete. In contrast, if there are still cells left to be compressed, the color data for the next cell is obtained (step 12), and the color data for the cell is compressed (step 14).

FIG. 2 is a flowchart showing the steps performed by the block compression technique of FIG. 1 in compressing a cell of the image (see step 14 in FIG. 1). Initially, the luminance for each pixel in the cell is calculated (step 16). Once the luminance for all of the pixels in the cells have been calculated, the minimum luminance (min) and the maximum luminance (max) among the pixels of the cell are determined (step 18). The difference between the maximum luminance and the minimum luminance is then compared with a fixed, nonadjustable threshold value (step 20). The difference between the maximum luminance and the minimum luminance specifies the variance in the luminances of the pixels. This value of the variance is used to determine what compression approach to employ. If the variance is not greater than the threshold, the steps shown in the flowchart of FIG. 3 are performed. However, if the variance is greater than the threshold, the steps shown in the flowchart of FIG. 5 are performed.

The steps shown in the flowchart of FIG. 3 will now be described. The average luminance of the pixels in the cell is calculated (step 22). A check is made to determine whether any pixels are left to be examined in the cell (step 24). If an unexamined pixel remains, the pixel is examined by obtaining the luminance of the pixel (step 26) and comparing the luminance of the pixel with the average luminance of the cell (step 28). If the luminance of the pixel is not greater than the average luminance, the pixel is marked as being in the set of dimmer pixels (step 30). On the other hand, if the luminance of the pixel is greater than the average luminance, the pixel is marked as being in the set of brighter pixels (step 32). Steps 24, 26, 28, and 30 or 32 are then repeated for the remaining pixels in the cell. When all of the pixels have been examined, the steps shown in the flowchart of FIG. 4 are performed.

In accordance with the steps shown in FIG. 4, the average color for the set of brighter pixels is calculated (step 34). The average color is then assigned as the color of each of the pixels in the set of brighter pixels (step 36). The assignment of the average color to the pixels in the set of brighter pixels is realized by manipulating a bit mask for the cell (see 48 in FIG. 6a and 54 in FIG. 6b), as will be described below. The average color for the set of dimmer pixels is, likewise, calculated (step 38). The average color for the set of dimmer pixels is then assigned as the color of each of the pixels in the set of dimmer pixels (step 40). As a result, each four-pixels-by-four-pixels cell has two colors assigned to its pixels.

The assignment of colors to the pixels in the compressed color data is realized by appropriately setting the corresponding bits in a bit mask representing the cell. The bit mask includes a bit at a specified position in the bit mask. The bit specifies the color of the pixel as one of the two possible color choices. The average color of the set of brighter pixels is associated with one of the possible bit values (i.e., "1" or "0"), and the average color of the set of dimmer pixels is associated with the other possible bit value. Hence, each bit value in the bit mask specifies the color of the associated pixel as either the average color of the set of brighter pixels or the average color of the set of dimmer pixels.

The above discussion has focused on the instances in which the variance is less than the threshold value, as checked by step 20 of FIG. 2. If, however, the variance is greater than the threshold, the steps shown in FIG. 5 are performed. In particular, the cell of four pixels by four pixels is divided into four sub-cells of two pixels by two pixels (step 42). The block compression technique of FIG. 1 then applies the compression approach of FIG. 3 iteratively for each of the two-by-two sub-cells. Each sub-cell is treated as if it is a separate cell. In order to iteratively apply this approach, a check is made to determine whether any two-by-two sub-cells are left to be examined (step 44). The non-compressed color data for the next sub-cell of two pixels by two pixels is obtained (step 46), and the above-described steps of the flowchart of FIG. 3 are performed. The main difference between the application of these steps with the sub-cells and the application of these steps with the four-pixels-by-four-pixels cells is the difference in the size of the cells to which the steps are applied. In particular, each sub-cell is two pixels by two pixels, whereas each cell is four pixels by four pixels. Steps 44 and 46 and the steps of FIG. 3 are repeated for each of the remaining sub-cells until all four of the sub-cells have been compressed.

The compressed color data resulting from the above-described compression technique is shown in FIGS. 6a and 6b. FIG. 6a shows the resulting compressed color data for the first described approach, wherein each cell of four pixels by four pixels is compressed without further division into sub-cells. The compressed color data includes a sixteen-bit bit mask 48 holding a bit for each pixel at a specified position in the bit mask. Each bit specifies the color of each pixel in the cell as being one of two choices: the average color of the set of brighter pixels or the average color of the set of dimmer pixels. In particular, a "1" value for a bit in the bit mask specifies a first color of the two possible colors for the pixels, and a "0" value for the bit specifies the other possible color. The color information for the set of brighter pixels is stored in a data word 50. The data word 50 includes five bits dedicated to red component information, five bits dedicated to green component information and five bits dedicated to blue component information. The leading bit of the data word 50 has a value of "0". An analogous data word 52 is produced for encoding the average color of the set of dimmer pixels.

FIG. 6b shows the compressed color data, wherein the original cell is divided into four two-pixels-by-two-pixels sub-cells. The compressed color data includes a sixteen-bit bit mask 54 that designates the colors of the respective pixels in the cell. The assignment of pixels to sub-cells is fixed and, thus, which sub-cell a pixel belongs to is known. Accordingly, the two color choices for each pixel are known, and the color for any pixel may be designated by a single bit in the bit mask 54. The bit mask 54 designates these choices by including a "0" or "1" in the bit position for the associated pixel. The compressed color information also includes, for each of the sub-cells, a data word encoding the average color of the set of brighter pixels and a data word encoding the average color of the set of dimmer pixels. Thus, data words 56 and 58 encode the color information for sub-cell #0. Similarly, data words 60 and 62 encode the color information for sub-cell #1; data words 64 and 66 encode the color information for sub-cell #2; and data words 68 and 70 encode the sub-cell information for cell #3. The leading bit of word 56, however, has a value of "1" rather than a value of "0" for the two-color case, so that it is known that the color information following the bit mask is for two-by-two sub-cells rather than a four-by-four cell.

SUMMARY OF THE INVENTION

It is an object of the present invention to provide an improved digital video data compression technique.

It is a further object of the present invention to provide a digital video data compression technique that realizes greater compression than conventional techniques.

The foregoing and other objects are realized by the present invention. In accordance with one aspect of the present invention, a method of compressing color data for pixels in a first cell of a frame of color data to produce compressed color data is practiced in a data processing system. In this method, the color data for each pixel in the first cell is compared with color data for a corresponding pixel in a second cell of pixels in a previous frame of color data. This comparison determines whether the color data in the first cell and the color data in the second cell are substantially the same. If the color data in the respective cells is substantially the same, the compressed color data is produced by encoding the color data for the pixels of the first cell as a duplicate of the color data for the pixels of the second cell (i.e., encoding the cell as a "skip cell"). The compressed color data may also be produced by calculating the luminance of each pixel in the first cell and dividing the pixels in the first cell into a set of brighter pixels and a set of dimmer pixels, based on the calculated luminances. The average color of pixels in the set of brighter pixels is calculated along with an average color of pixels in the set of dimmer pixels. The average colors are then assigned to each of the pixels in the respective sets.

After determining whether color data in the first cell is substantially the same as the color data in the second cell, it may be determined whether all the pixels in the first cell have color data of substantially the same color. If all of the pixels in the first cell have color data of substantially the same color, the compressed color data is produced by encoding the first cell as a cell of the same color. The resulting compressed color data may include fixed bit values that specify that the pixels of the first cell are all substantially the same color. The compressed color data may also include an encoding of an average color of the pixels in the cell.

In order to determine whether all of the pixels in the first cell have color data of substantially the same color, the following steps may be performed. First, an average color is calculated for the pixels in the first cell. Color data for a third cell is created. Each pixel in the third cell has color data that is equal to the calculated average color of the pixels in the first cell. The color data of each pixel in the first cell is compared with color data of a corresponding pixel in the third cell to produce a total difference in color between pixels of the first cell and the third cell. A determination is made whether the total difference in color is less than a first threshold. If the total difference is less than the first threshold, all the pixels in the first cell have color data of substantially the same color.

A quality level may be set for the compressed color data. The first threshold, described above, may be calculated as a value that is inversely proportional to the desired quality level. When the desired quality level changes to a new quality level, the first threshold may be recalculated to a value that is inversely proportional to the new quality level.

The method may also include the step of comparing the variance in color between the first cell and the third cell with a second threshold. If the variance in luminance exceeds the second threshold, the first cell is divided into sub-cells. Each sub-cell includes a subset of the pixels of the first cell. For each sub-cell, the pixels of the sub-cell are divided into a set of brighter pixels and a set of dimmer pixels. The average color of pixels in the set of brighter pixels is calculated, as well as the average color of pixels in the set of dimmer pixels. The compressed color data is produced by assigning the average color of the set of brighter pixels to each pixel in the set of brighter pixels and assigning the average color of the set of dimmer pixels to each pixel in the set of dimmer pixels.

The second threshold may be selected as a value that is inversely proportional to a selected quality level. Hence, if the quality level changes, the second threshold value is recalculated.

The compressed color data produced by this method may assume different formats. In particular, the compressed color data may be in an eight-bit format or, alternatively, in a sixteen-bit format.

In accordance with another aspect of the present invention, a method of decompressing compressed color data for pixels of a cell is performed in a data processing system. In this method, a determination is made whether the color data for the cell is compressed as a solid-color cell. If the color data for the cell is compressed as a solid-color cell, the color data of the cell is decompressed by assigning each pixel in the cell a color that is encoded in the compressed color data. A determination is also made whether the color data for the cell is compressed as a two-color cell. If the color data for the cell is compressed as a two-color cell, the color data of the cell is decompressed by assigning each pixel one of two colors encoded in encodings of the compressed color data, based upon a corresponding value in a bit mask that is contained in the compressed color data.

This method may also include the additional steps of determining whether the cell is a skip cell and, if the cell is a skip cell, decompressing the color data of the cell by assigning each pixel in the cell a color that has been assigned to a corresponding pixel in a second cell of a preceding frame. This method may further include the additional steps of determining whether the cell is an eight-color cell, and if the cell is an eight-color cell, decompressing the color data of the cell by assigning each pixel in each sub-cell one of two colors encoded for the sub-cell in the compressed color data by a corresponding value in a bit mask that is included in the compressed color data.

BRIEF DESCRIPTION OF THE DRAWINGS

FIG. 9 illustrates the sequencing of pixels in a cell used by the preferred embodiment described herein.

DETAILED DESCRIPTION OF THE INVENTION

The present invention provides greater compression of digital video data than the conventional system shown in FIGS. 1 through 6b. Greater compression is realized by using techniques for compressing a cell having color data of substantially one color and/or by using techniques for compressing a cell having color data that is substantially identical to the color data of at least one previous cell. In addition, the preferred embodiment of the present invention described herein may provide for two-color compression of a cell and eight-color compression of a cell.

Figure 7:
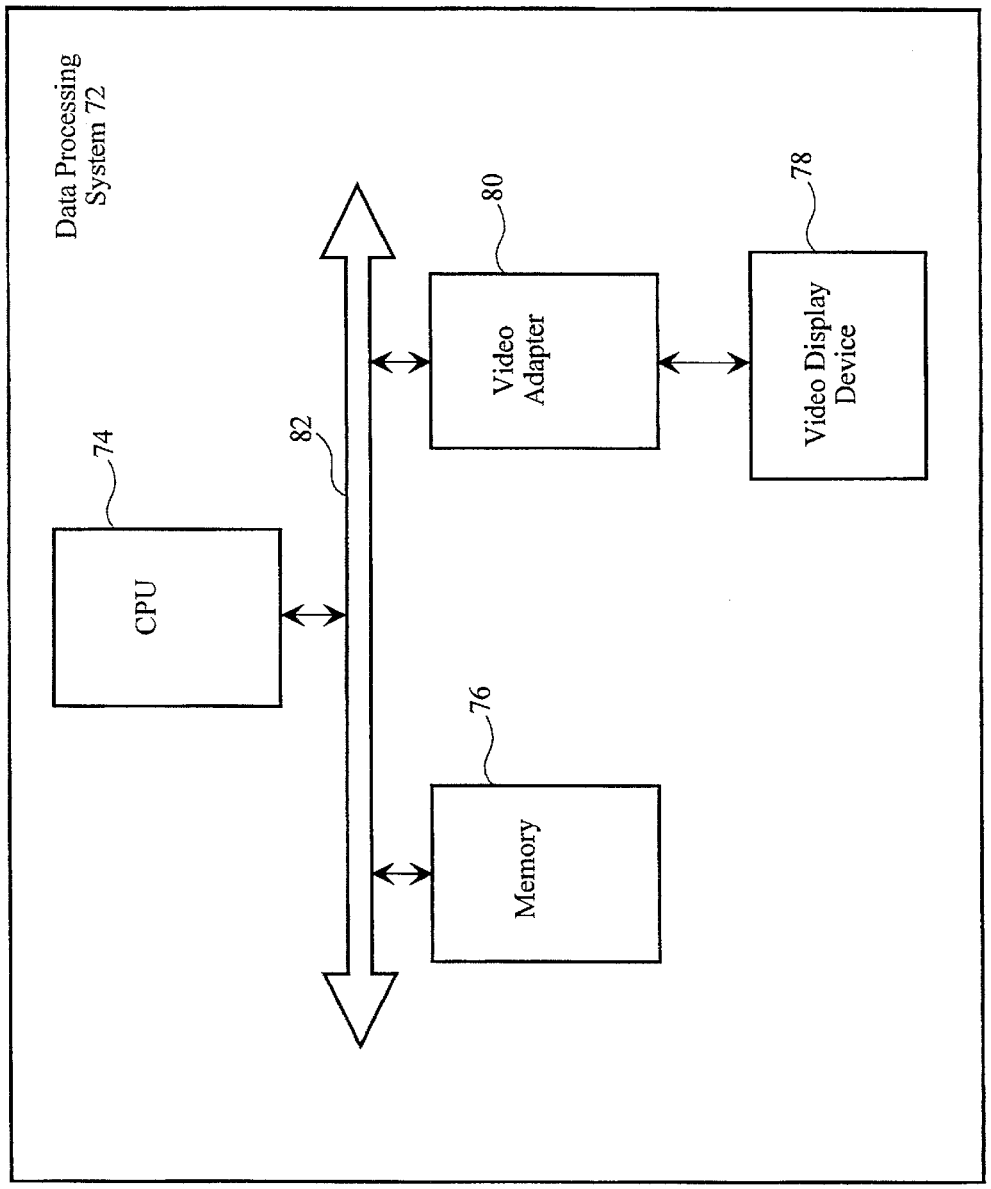
FIG. 7 illustrates an example data processing system for practicing a preferred embodiment of the present invention described herein.

The present invention may be used in applications that require compression of digital video data. A preferred embodiment described herein provides both compression and decompression of digital video data. The preferred embodiment described herein may be encoded in software that is executed on any one of a number of different data processing configurations, including the data processing system 72 shown in FIG. 7. In this data processing system 72, a central processing unit (CPU) 74 executes instructions of programs held in memory 76. The CPU 74 communicates with the memory 76 over a communication path 82, such as a bus, interconnection network or other suitable communication mechanism. The CPU 74 may also communicate with a video adapter 80 through the communication path 82. The video adapter serves as an interface between the CPU 74 and a video display device 78. When the CPU 74 desires to display an image on the video display device 78, it passes appropriate digital video data to the video adapter 80. The video adapter 80 generates electrical signals that are passed to the video display device 78 to cause the image to be displayed on the video display device.

Figure 8:
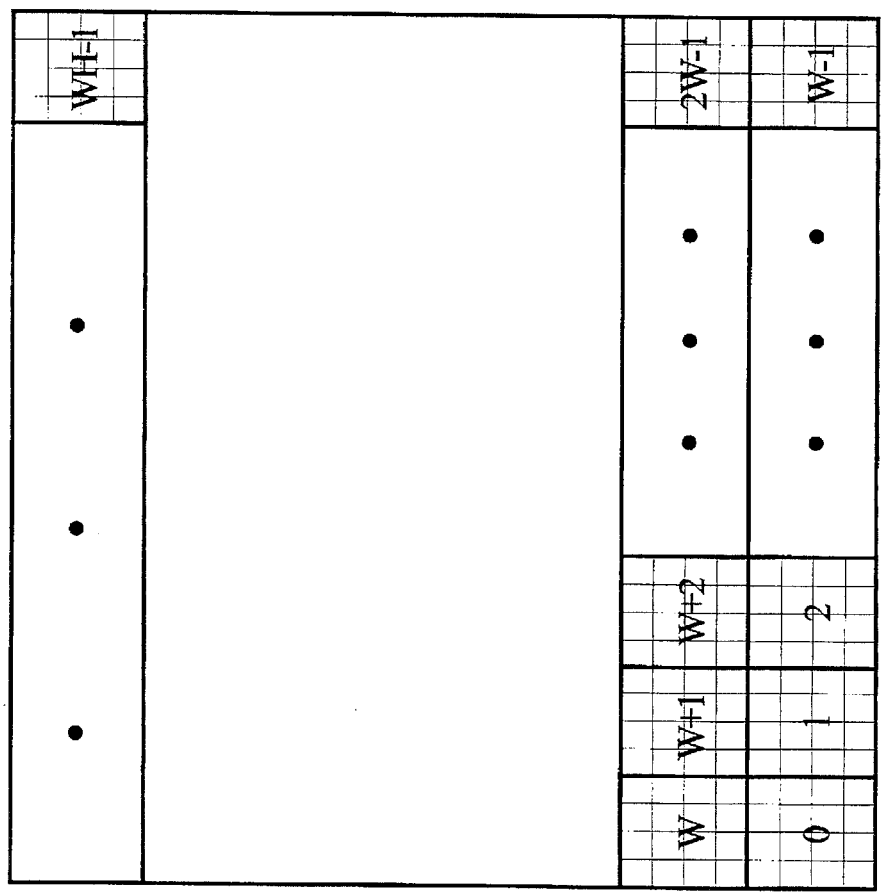
FIG. 8 illustrates the sequencing of cells used by the preferred embodiment of the invention described herein.

In accordance with the preferred embodiment described herein, a frame of video data is divided into cells of four-pixels-by-four-pixels, as shown in FIG. 8. Those skilled in the art will appreciate that this cell size is merely illustrative and that other cell sizes may be used. Each row of a frame of the image includes "W" cells (see FIG. 8), where "W" specifies the width of a row in number of cells. Each column includes "H" cells, where "H" specifies the height of a column in number of cells. Each successive cell is assigned a position in a sequence of data for the frame, as shown in FIG. 8. The sequence of cells in the frame begins with cell #0 in the lower left-hand corner of the frame and progresses across the row and up successive rows of cells, as shown in FIG. 8. (Note that each successive cell is given a successively higher number.) The compressed data for the cells is stored according to this sequence ranging from cell #0 to cell #WH-1.

Figure 9:
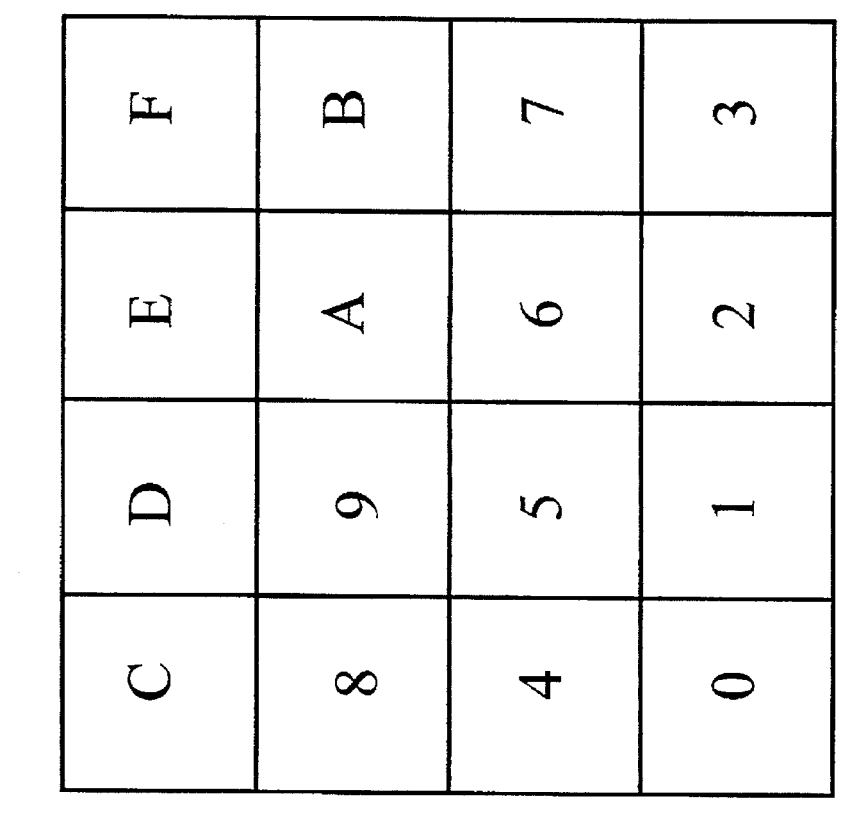

As shown in FIG. 9, the color data of pixels within each cell are also stored according to a sequence. The color data of the pixels follow a sequence beginning with pixel #0 in the lower left-hand corner of each cell. The sequence progresses across each pixel row of the cell and wraps around to the beginning of the next pixel row for each successive pixel row up to pixel "F".

Figure 12:
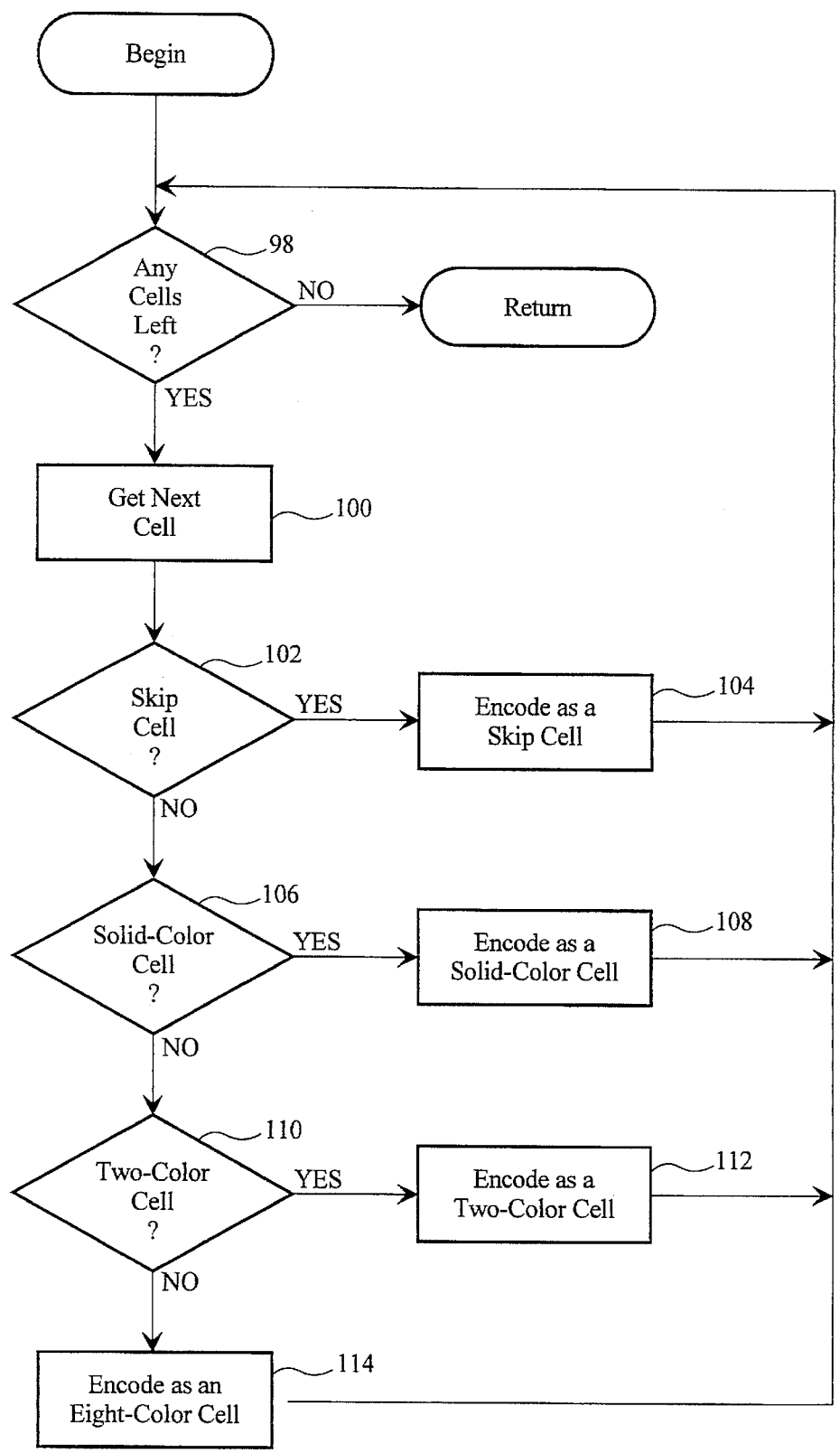
FIG. 12 is a flowchart illustrating an overview of the steps performed by the preferred embodiment described herein.

In accordance with one aspect of the preferred embodiment described herein, the cells of a frame of digital video data are compressed in accordance with the steps shown in the flowchart of FIG. 12. Before discussing the details of the flowchart of FIG. 12, it is helpful to consider some preliminary matters.

Figure 10A:
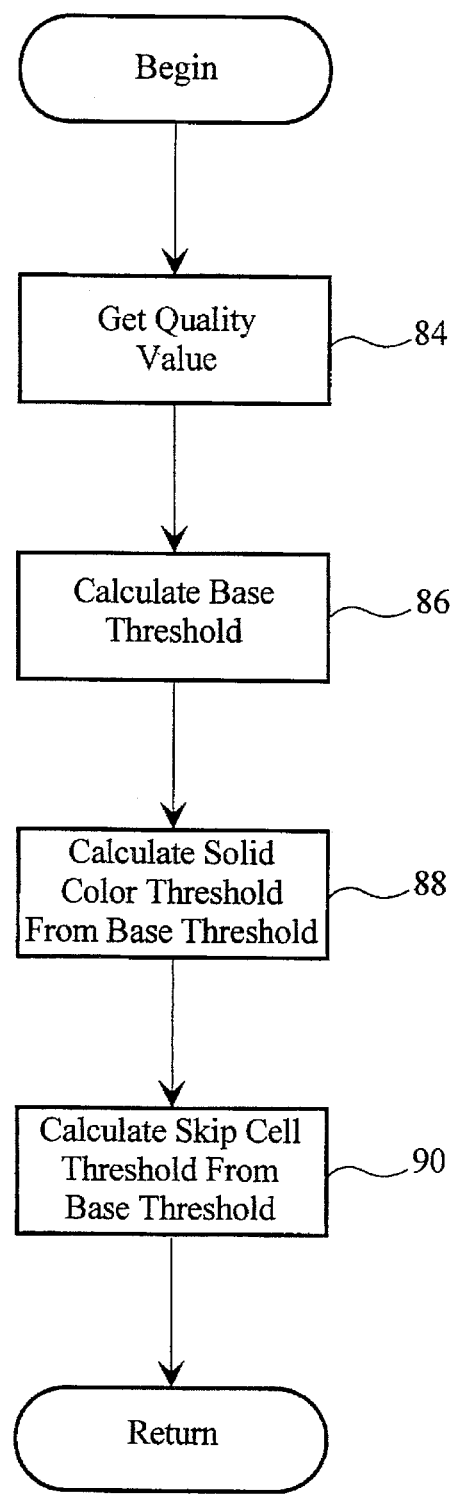
FIG. 10a is a flowchart illustrating the steps performed to calculate thresholds for the preferred embodiment described herein.

The data processing system 72 uses a number of thresholds for decision making during the compression of the cells. These thresholds are calculated in accordance with the steps shown in the flowchart of FIG. 10a. Initially, a user specifies a quality value (step 84), such as a value in the range from 0 to 10,000, wherein 10,000 represents the highest quality level and 0 represents the lowest quality level. During compression in this preferred embodiment, certain data is typically lost in the compression (i.e., it is a lossy compression technique). The user-selected quality level specifies the acceptable level of data loss. This quality level is then used to calculate a base threshold value (step 86). The base threshold value is calculated as:

$$(1-(\text{quality level})/10{,}000)^4 * ((256^2)/2)$$

Those skilled in the art will appreciate that the thresholds may also be calculated in other ways. The described approach is merely illustrative.

Figure 10B:
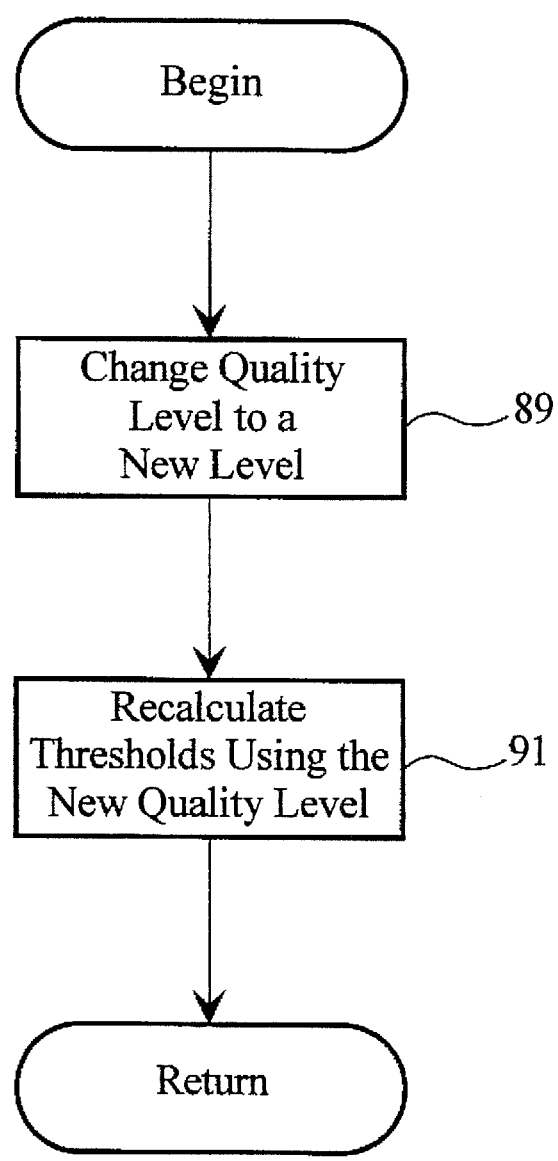
FIG. 10b is a flowchart illustrating the steps performed when the quality level is changed to a new level in the preferred embodiment described herein.

A solid-color threshold and a skip-cell threshold are calculated from this base threshold as fixed ratios of the base threshold (steps 88 and 90). The ratios may be varied based on the nature of the application and/or type of image data being compressed. A user of the data processing system 72 (FIG. 7) may subsequently change the quality level to a new level (step 89 in FIG. 10b). New thresholds are then calculated using the new quality level (step 91).

Figure 11:
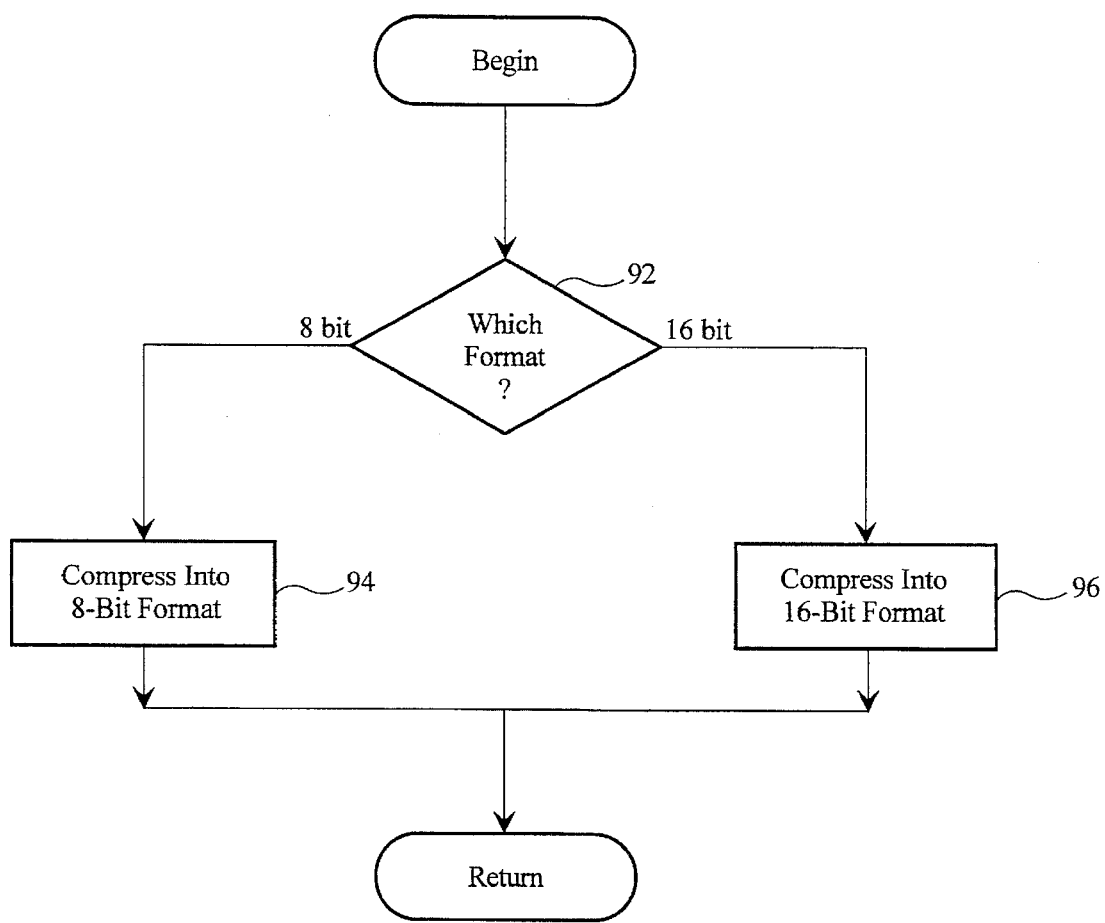
FIG. 11 is a flowchart illustrating the steps performed to select the output format for the compressed color data in the preferred embodiment described herein.

The preferred embodiment described herein has the capability of producing either an eight-bit output format or a sixteen-bit output format. Thus, the data processing system 72 (FIG. 7) must determine which format a user requires (step 92 in FIG. 11). If the user requires a sixteen-bit format, code for compressing the digital video data into a sixteen-bit output format is executed (step 96). In contrast, if the user requires an eight-bit output format, code for compressing the digital video data compressed into an eight-bit output format is executed (step 94).

As mentioned above, the cells of a frame of digital video data are compressed by executing the steps shown in the flowchart of FIG. 12. The data processing system 72 (FIG. 7) checks whether any cells to be compressed remain in the frame (step 98 in FIG. 12). If there are no cells left to be compressed, the entire frame has been fully compressed. However, if there are cells left to be compressed, the system gets the next one of the remaining cells to be compressed (step 100). The data processing system 72 (FIG. 7) then checks whether the cell is a skip cell (step 102 in FIG. 12). A skip cell is a cell having color data that is substantially identical to a corresponding cell in a previous frame. If the cell is a skip cell, the cell is compressed accordingly (step 104). If the cell is not a skip cell, a determination is made whether the cell is a solid-color cell (step 106). A solid-color cell is one in which the pixels in the cell are substantially identical, and therefore, the cell can be encoded as a single-color cell. If the cell is a solid-color cell, the cell is compressed as a solid-color cell (step 108). The data processing system 72 (FIG. 7) then checks whether the cell is a two-color cell (step 110). If the cell is a two-color cell, the cell is compressed as a two-color cell (step 112). If the cell is not a solid-color cell, a skip cell or a two-color cell, the cell is encoded as an eight-color cell (step 114). The above-described steps are repeated until all the cells of the frame have been properly compressed.

In order to more fully understand the iterative technique shown in the flowchart of FIG. 12, it is helpful to further examine the details of determining cell type in steps 102, 106 and 110 and to further examine the details of encoding cells in steps 104, 108 and 112.

Figure 13:
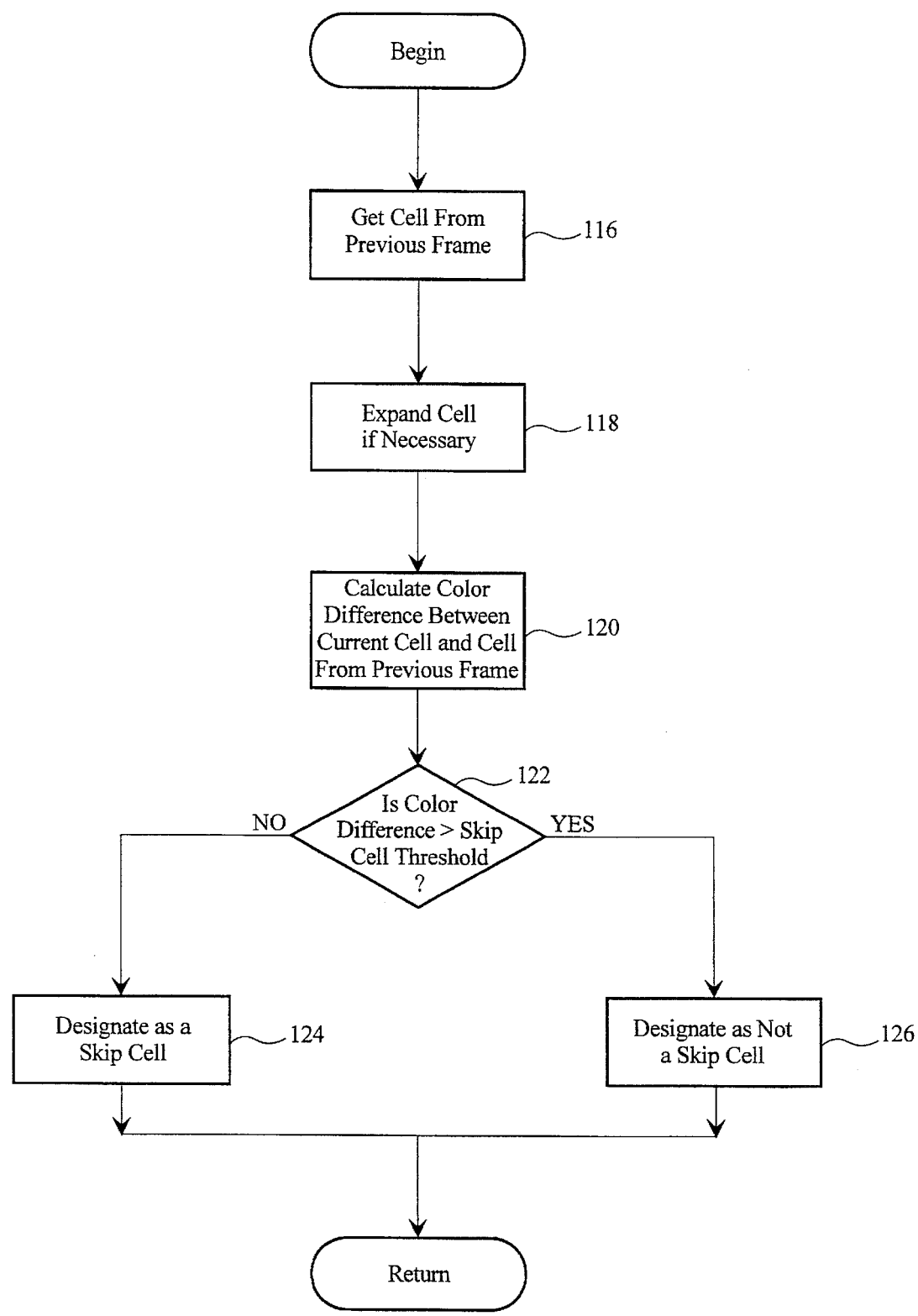
FIG. 13 is a flowchart illustrating the steps performed by the preferred embodiment to determine if a cell is a skip cell.

To make the determination of whether the cell is a skip cell (see step 102 in FIG. 12), the data processing system 72 (FIG. 7) performs the steps shown in the flowchart of FIG. 13. First, a cell is obtained from a previous frame, such as the immediately succeeding frame (step 116). Typically, this cell is a like positioned cell in the previous frame as the cell being compressed. As the color data for the cell from the previous frame may already be compressed, it may be necessary to expand the color data (step 118 in FIG. 13). The color difference between the current cell and the cell from the previous frame is then calculated, using the sum of the squares of the differences approach (step 120). The color difference may be calculated as the sum of the squares of the differences between the red, green and blue components of the respective pixels (i.e., the Euclidean distance between the red, green and blue components of the respective cells in a red, green, blue color space). A determination is then made whether the color difference is greater than the skip-cell threshold (step 122). If the color difference is not greater than the skip-cell threshold, the cell is designated as a skip cell (step 124). In contrast, if the color difference is greater than the skip-cell threshold, the difference between the two cells is too large, and the cell is designated as not being a skip cell (step 126).

Figure 14:
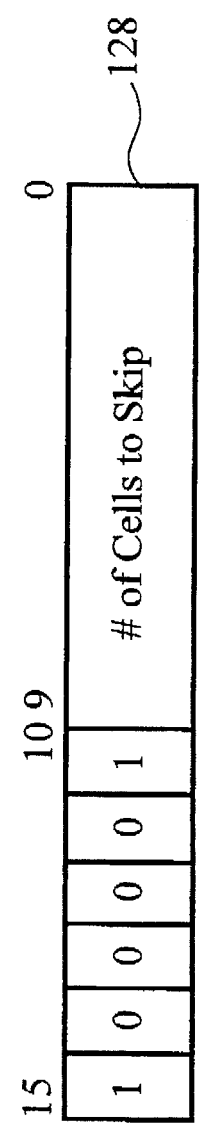
FIG. 14 illustrates the format produced by the first preferred embodiment for the compressed color data for a skip cell.

The designation as a skip cell or is not a skip cell is used to make the decision in step 102 of FIG. 12. If it is determined that the cell is a skip cell, the cell is encoded as a skip cell (step 104 in FIG. 12). The format for the compressed encoded skip cell is shown in FIG. 14. The format is the same for both a sixteen-bit format and an eight-bit format. The compressed output is a single data word 128 having a fixed value of "100001" for bits fifteen through ten. The remaining bits specify the number of cells that are substantially identical.

Figure 15:
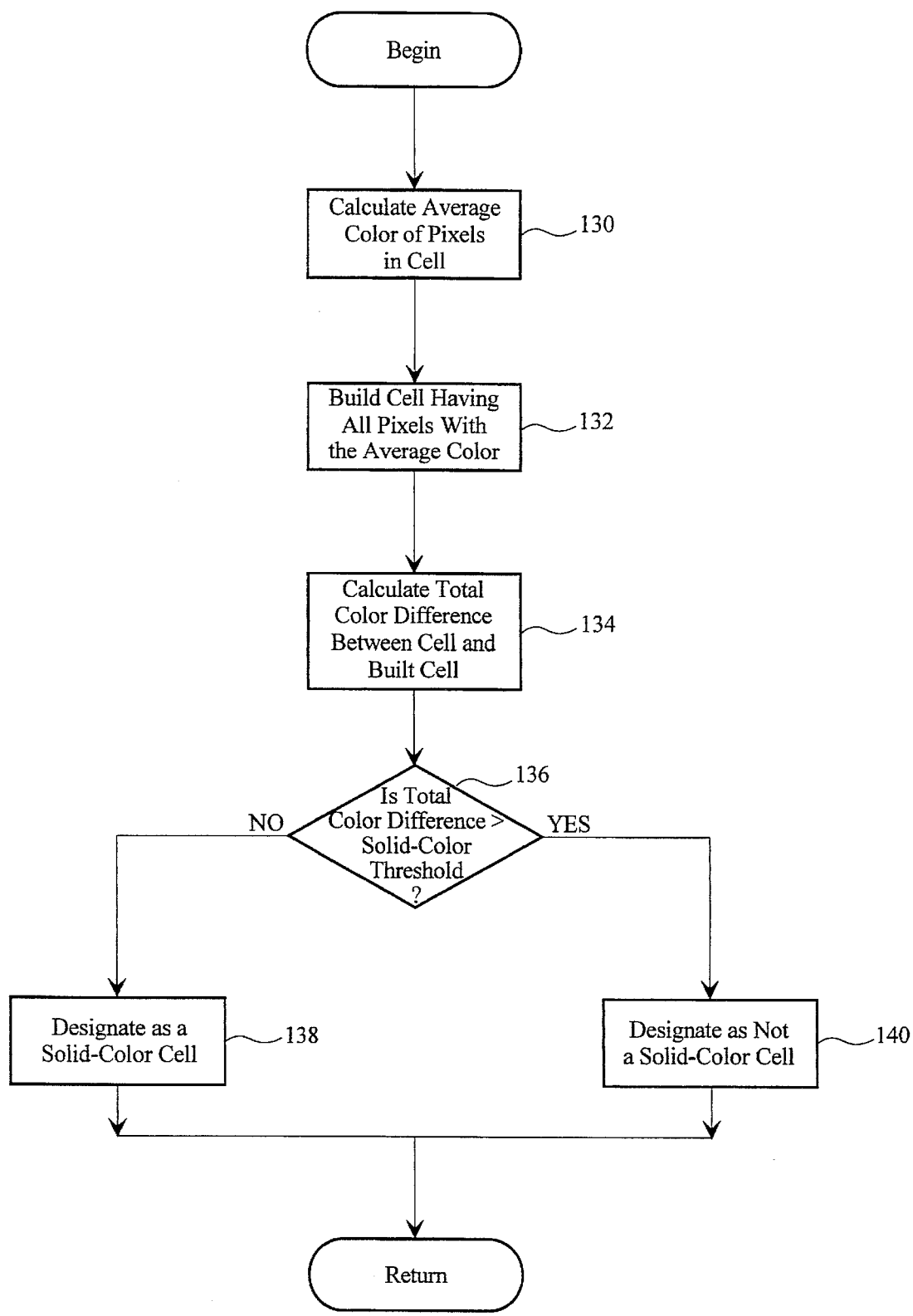
FIG. 15 is a flowchart illustrating the steps performed by the preferred embodiment described herein to determine if a cell is a solid-color cell.

In order to determine whether a cell is a solid-color cell (see step 106 in FIG. 12), the data processing system 72 (FIG. 7) performs the steps shown in the flowchart of FIG. 15. First, the average color of the pixels in the cell is calculated (step 130). An imaginary cell is then built in which all of the pixels have the average color (step 132). The total color difference between the cell and the imaginary cell is then calculated (step 134). The calculated total color difference is then compared with the solid-color threshold to determine if the total color difference is greater than the solid-color threshold (step 136). If the total color difference is not greater than the solid-color threshold, there is an insubstantial difference in colors of pixels in the two cells and the cell is designated as a solid-color cell (step 138). On the other hand, if the total color difference is greater than the solid-color threshold, the cell is designated as not a solid-color cell (step 140).

Figure 16A:
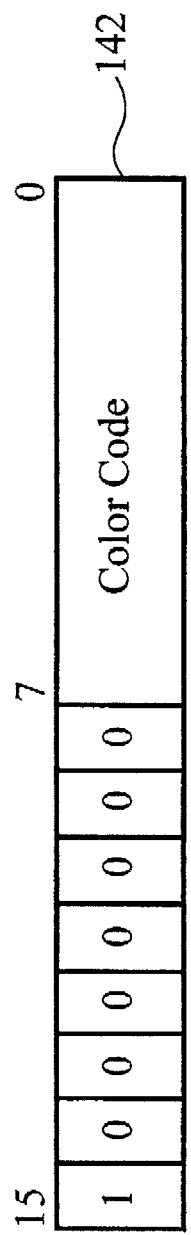
FIG. 16a illustrates the eight-bit output format produced by the preferred embodiment for the compressed color data for a solid-color cell.
Figure 16B:
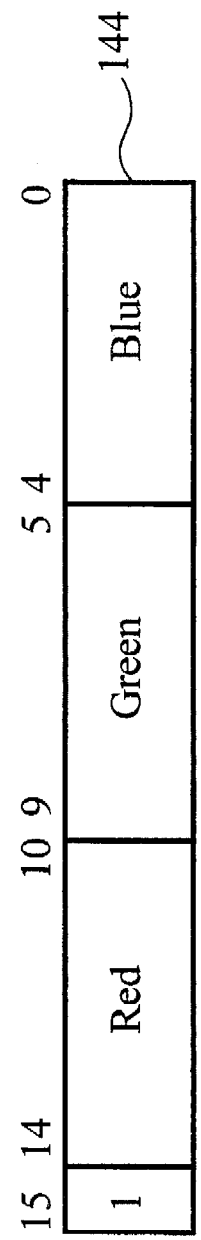
FIG. 16b illustrates the sixteen-bit format produced by the preferred embodiment for the compressed color data for a solid-color cell.

Using the designation provided in either step 138 or step 140 of FIG. 15, the data processing system 72 (FIG. 7) determines whether to encode the cell as a solid-color cell (step 106 of FIG. 12). If it is determined that the cell should be encoded as a solid-color cell, the cell may be encoded in either an eight-bit format or a sixteen-bit format. FIG. 16a shows an encoded data word 142 for a solid-color cell. The eight most significant bits are set to have a value of "10000000". The remaining eight least significant bits hold a binary color code value. If, however, a sixteen-bit bit output format is desired, the format of FIG. 16b is produced. The compressed output in the sixteen-bit output format is a data word 144 having a five-bit red component, a five-bit green component and a five-bit blue component. The most significant bit (i.e., bit fifteen) of the data word 144 has a value of "1".

Figure 17:
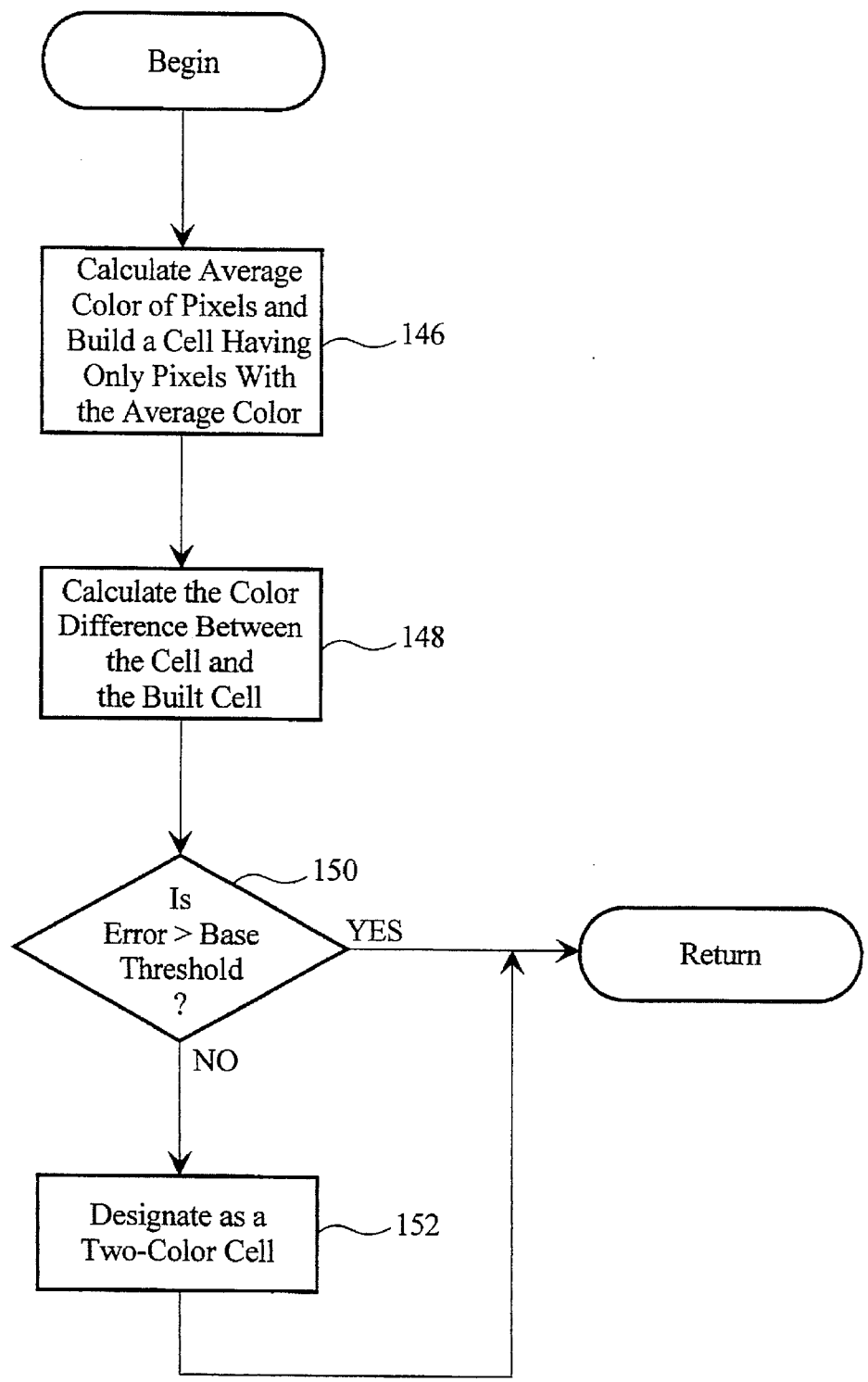
FIG. 17 is a flowchart illustrating the steps performed by the preferred embodiment to determine if a cell is a two-color cell.

The determination of whether a cell is a two-color cell (see step 110 in FIG. 12) is performed by executing the steps shown in the flowchart of FIG. 17. The average color of the pixels in the cell is calculated and a cell is built having pixels which all have the average color (step 146). The color difference between the cell and the built cell is calculated as the sum of the squares of the differences (step 148). The color difference is then compared with the base threshold (step 150). If the color difference is not greater than the base threshold, the cell is designated a two-color cell (step 152). If the color difference is greater than the base threshold, the variance of pixel color in the cell is large enough that two-color compression will yield an unsatisfactory result and, thus, step 114 of FIG. 12 is performed to encode the cell as an eight-color cell. The approach adopted by the preferred embodiment herein for two-color compression differs from the two-color cell compression, described in the Background of the Invention, in that the base threshold is adjustable depending upon the quality selected by the user. In the conventional approach, the threshold is fixed and not readily adjustable.

Figure 1:
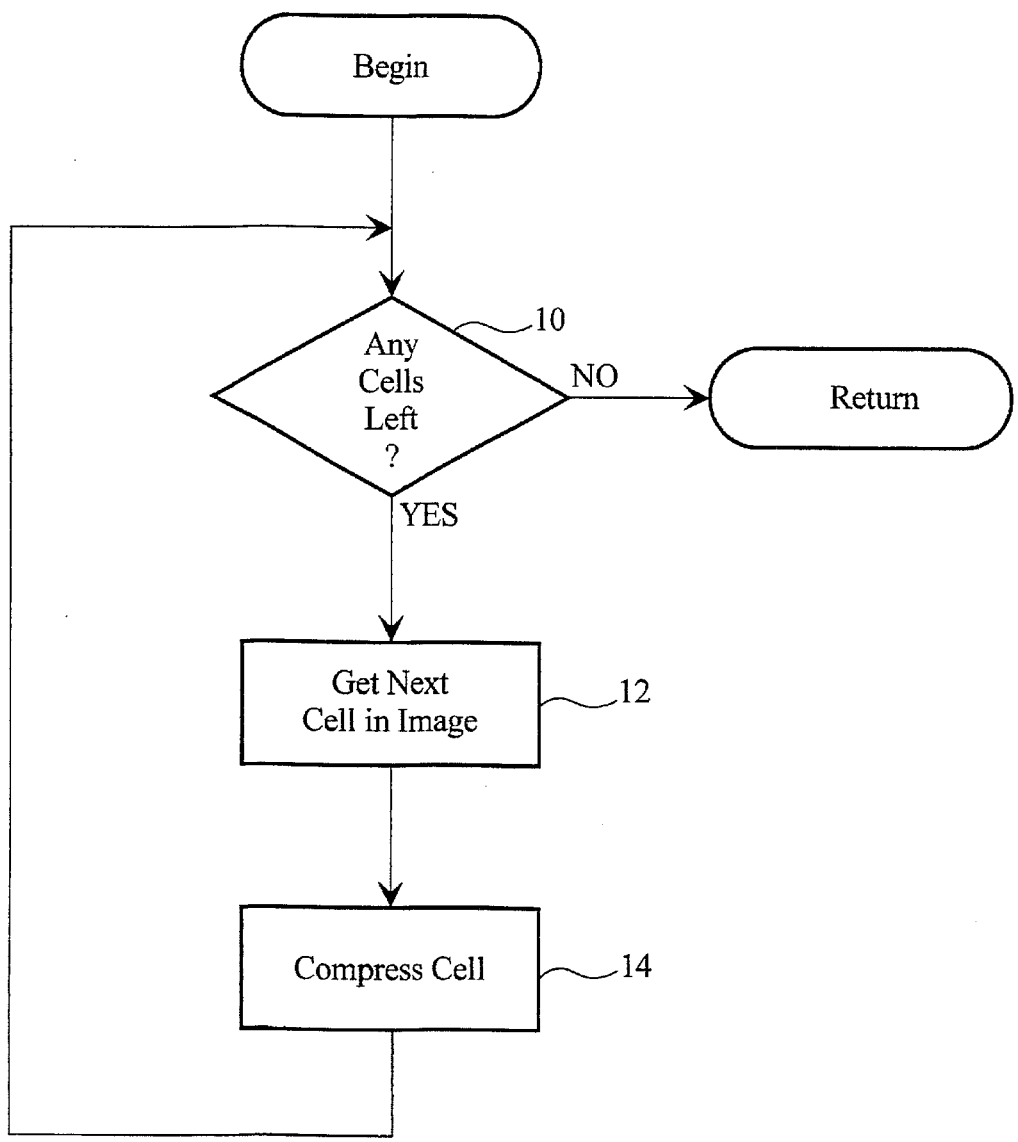
FIG. 1 is a flowchart illustrating the iterative approach adopted by a prior art system for compressing digital video data.
Figure 2:
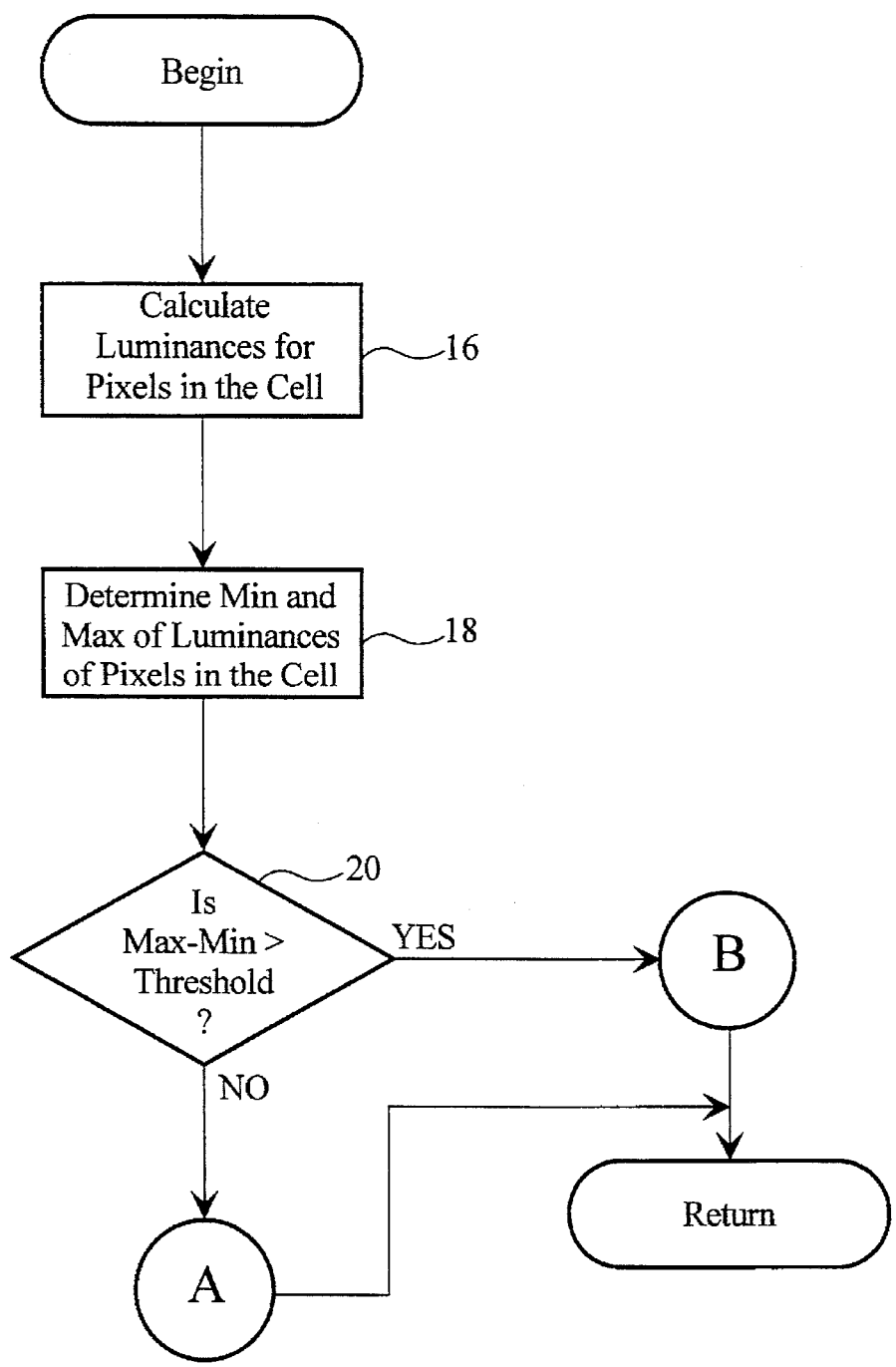
FIG. 2 is a flowchart illustrating the steps performed on each cell to compress the cell in the conventional system of FIG. 1.
Figure 3:
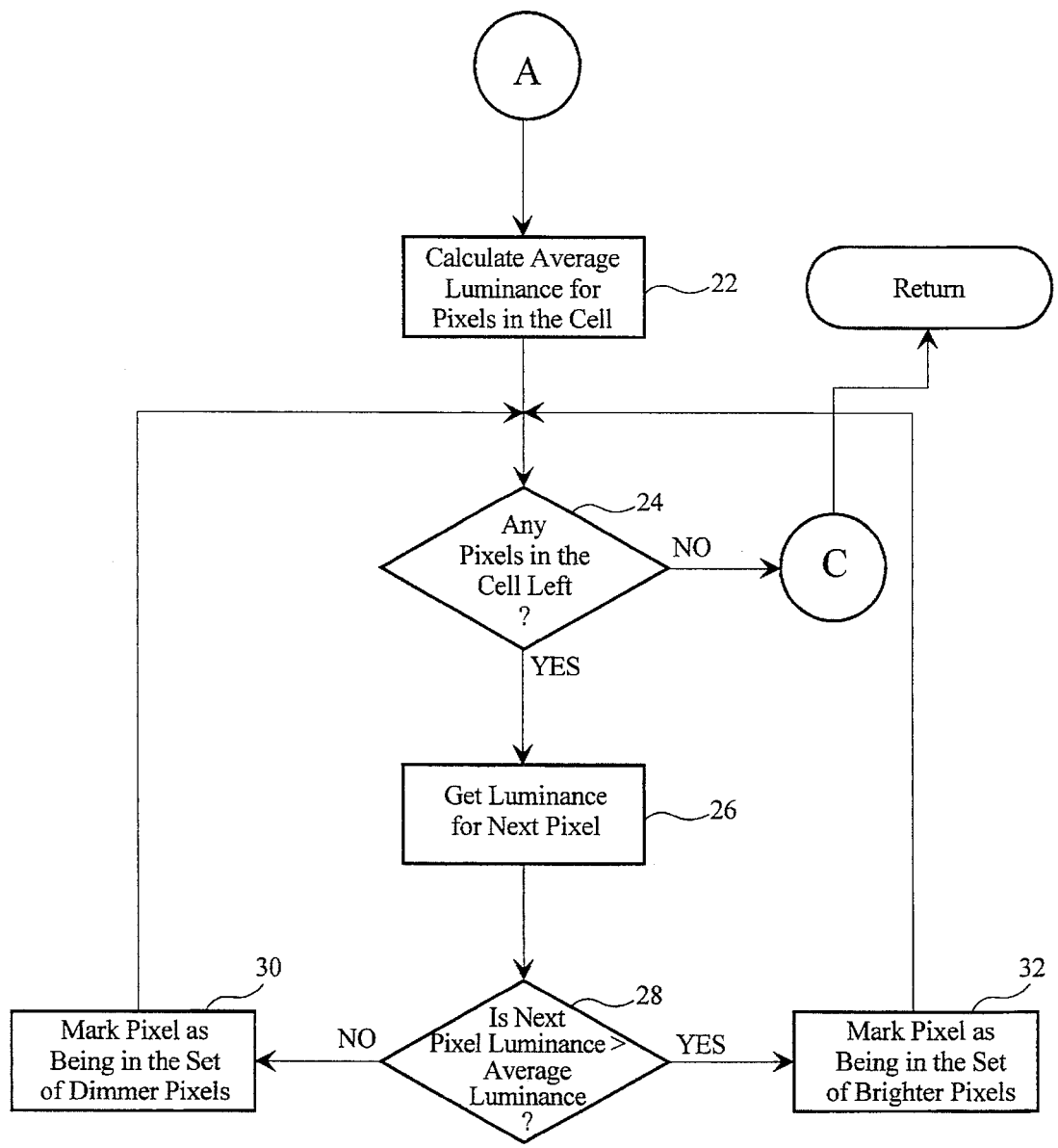
FIG. 3 is a flowchart illustrating the steps performed by the conventional system of FIG. 1, when the variance in luminances in the cell is less than a threshold value.
Figure 4:
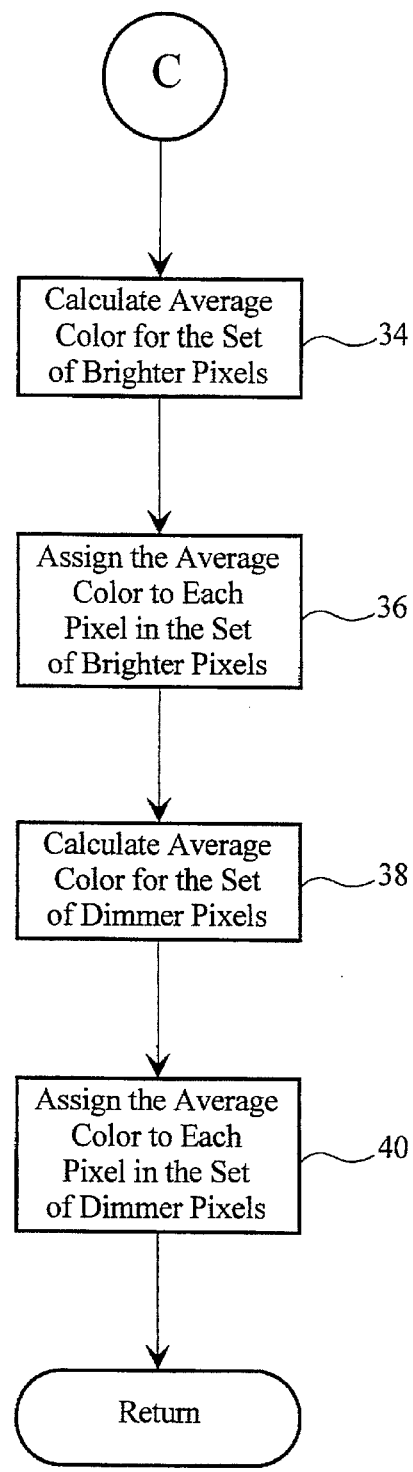
FIG. 4 is a flowchart illustrating the steps that are performed to produce the compressed color data in the flowchart of FIG. 3.
Figure 18A:
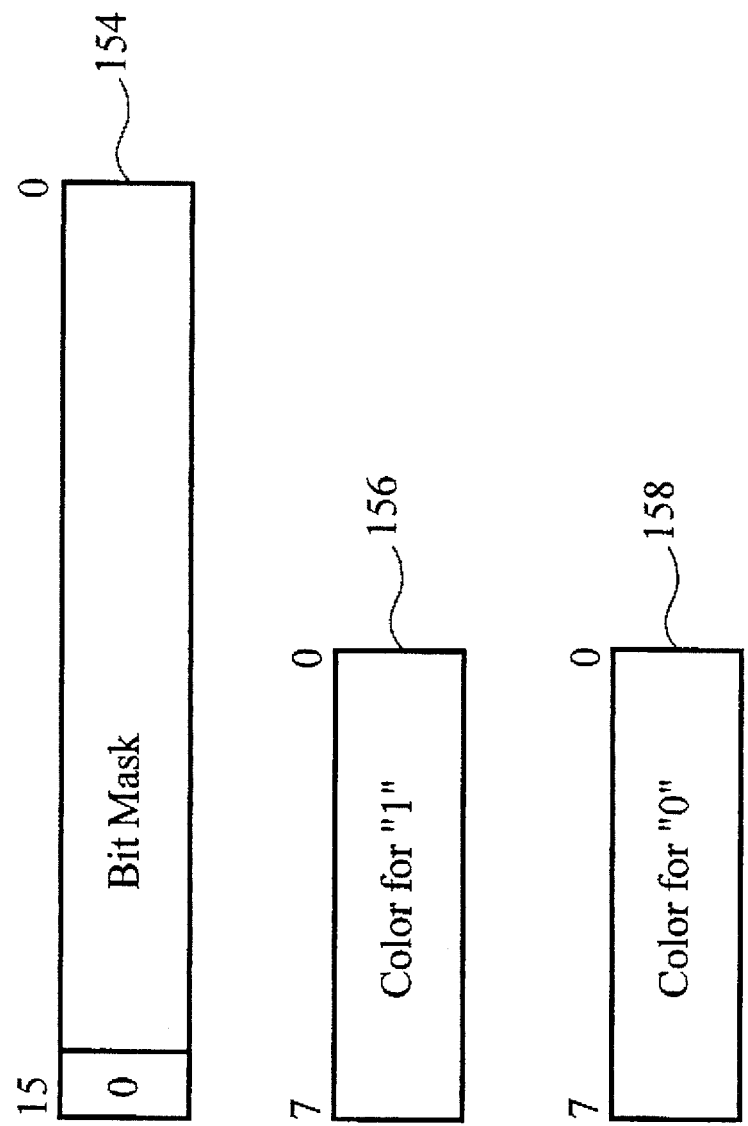
FIG. 18a illustrates the eight-bit format produced by the preferred embodiment for the compressed color data for a two-color cell.

In order to encode the cell as a two-color cell (see step 112 in FIG. 12), the steps shown in FIGS. 3 and 4 are performed, as described above in the Background of the Invention. The resulting compressed color data may be encoded in an eight-bit format or a sixteen-bit format. FIG. 18a shows the compressed color data when an eight-bit format is used. The resulting compressed color data includes three parts: a bit mask 154; an eight-bit encoding 156 of the color for "1" values in the bit mask; and an eight-bit encoding 158 of the color for "0" values in the bit mask. The most significant bit (i.e., bit fifteen) of the bitmap 154 is normalized to always have a constant value of "0". Specifically, normalization includes swapping the choice of color for "0" values and the choice of color for "1" values if bit fifteen would, otherwise, have a value of "1". The eight-bit encodings 156 and 158 of colors each specify an index into a color table for a specific color.

Figure 18B:
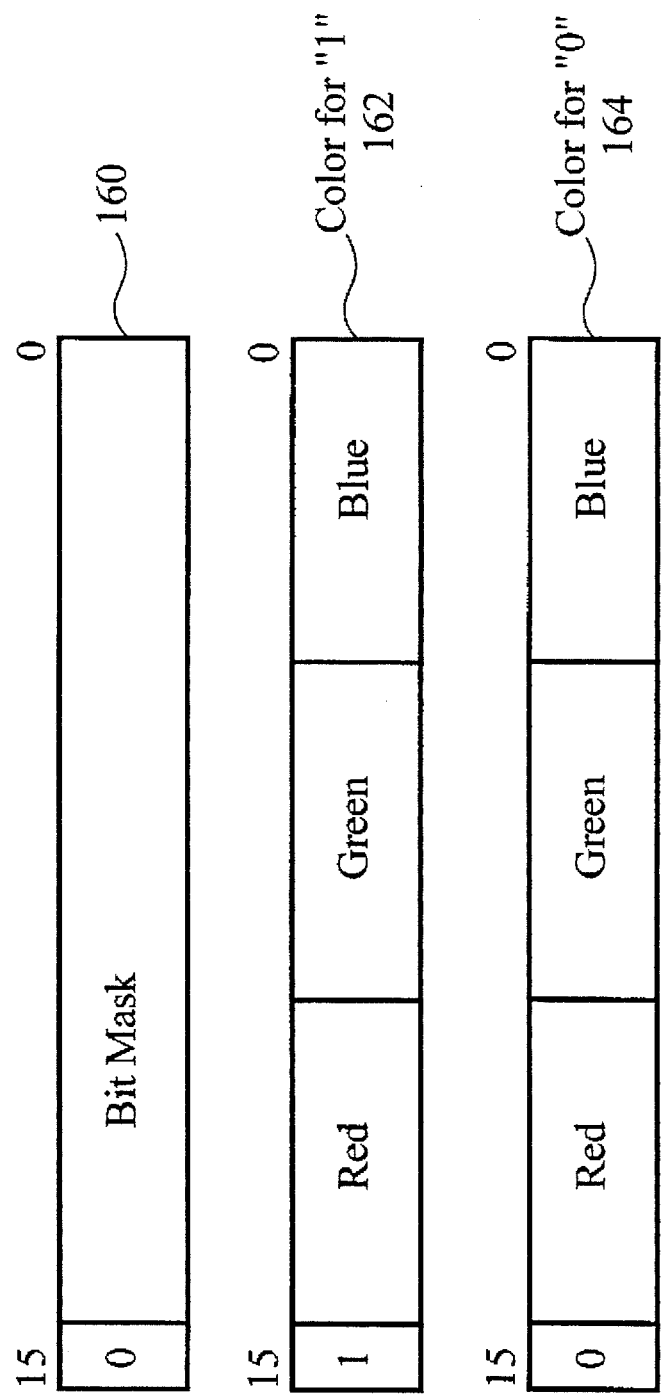
FIG. 18b illustrates the sixteen-bit format produced by the preferred embodiment for the compressed color data for a two-color cell.

FIG. 18b shows the compressed color data for the sixteen-bit output format. In this instance, the compressed color data includes three parts: a bit mask 160; a sixteen-bit encoding 162 of the color for "1" values in the bit mask; and a sixteen-bit encoding 164 of the color for "0" values in the bit mask. Bit fifteen of the bit mask 160 has a value of "0". The bit mask 160 is normalized, as described above, to ensure this "0" value for bit fifteen. The sixteen-bit encoding 162 of the color for "1" in the bit mask includes red, green and blue components. Bit fifteen of the encoding 162 is set as "1". The encoding 164 of the color for "0" in the bit mask, likewise, includes red component, green component and blue component values. The encoding 164 differs from the encoding 162 in that bit fifteen is set to have a value of "0".

Figure 5:
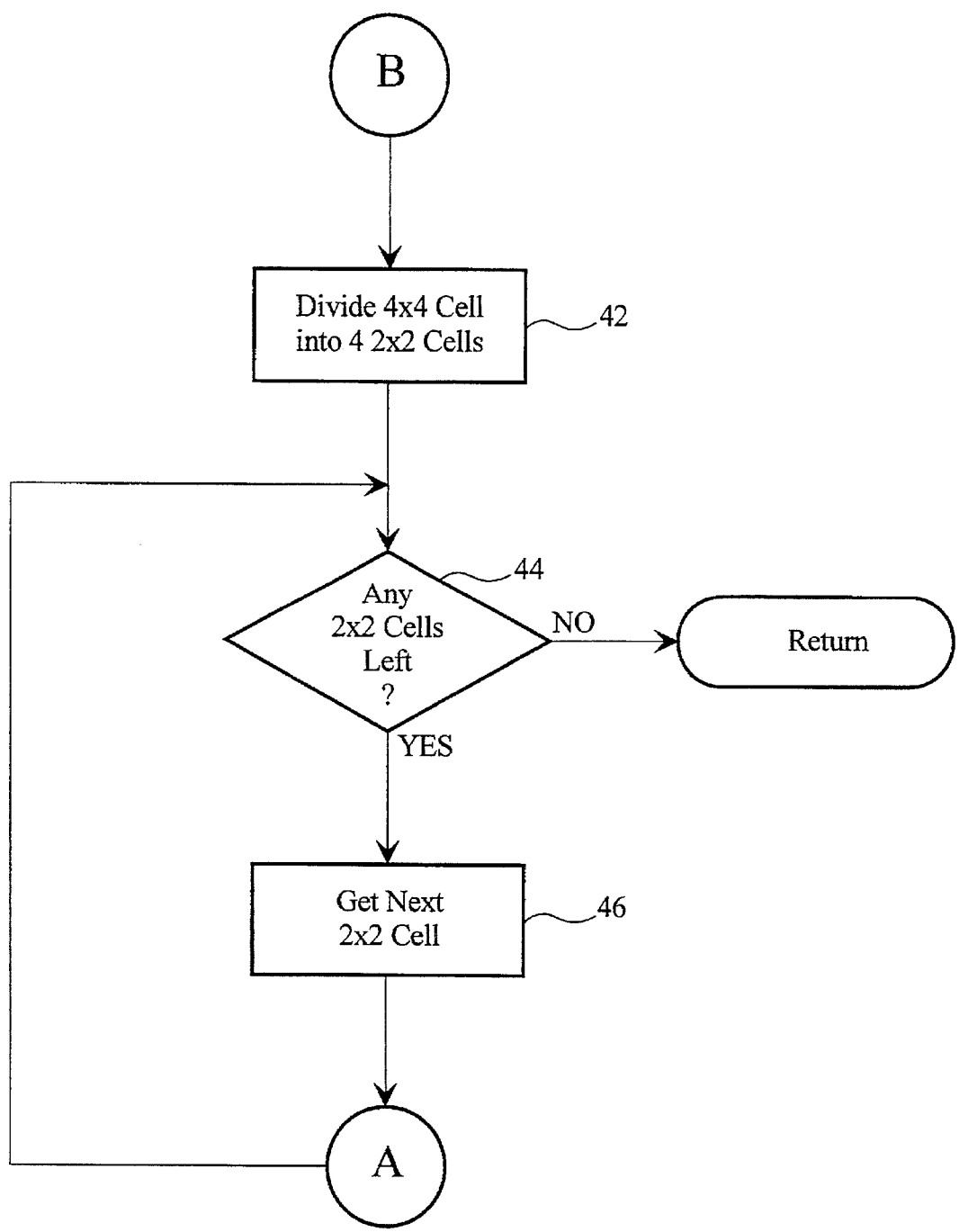
FIG. 5 is a flowchart illustrating the steps performed by the conventional system of FIG. 1, when the variance in luminances in the cell exceeds a threshold value.
Figure 6A:
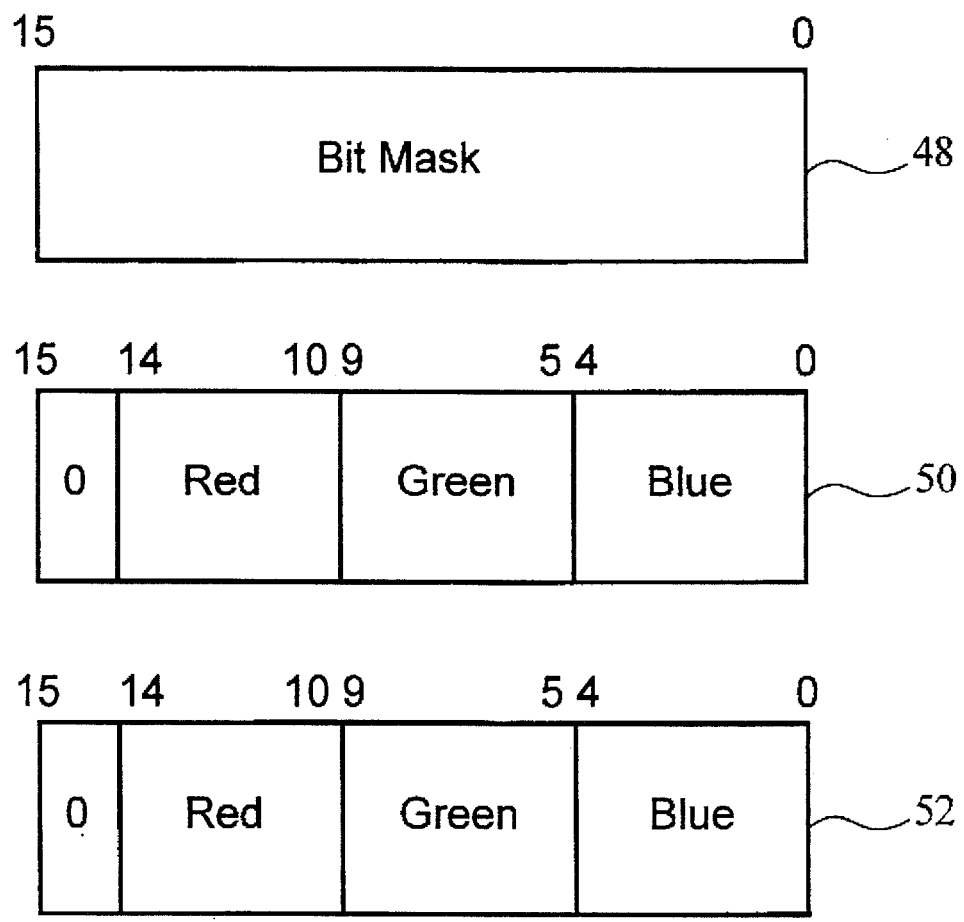
FIG. 6a illustrates the format of the compressed color data resulting from execution of the steps shown in FIG. 3.
Figure 6B:
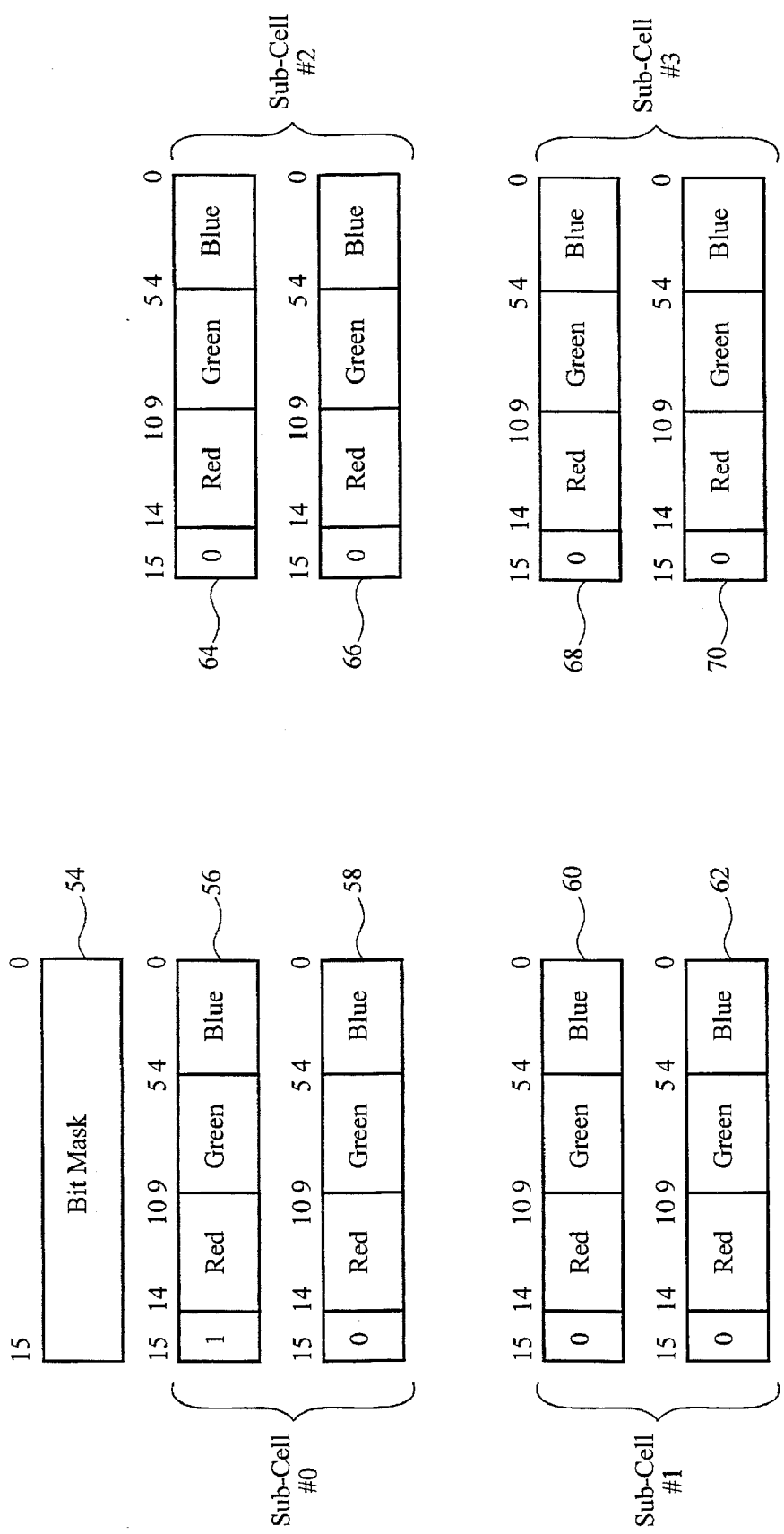
FIG. 6b shows the format of the compressed color data resulting from execution of the steps shown in FIG. 5.
Figure 19:
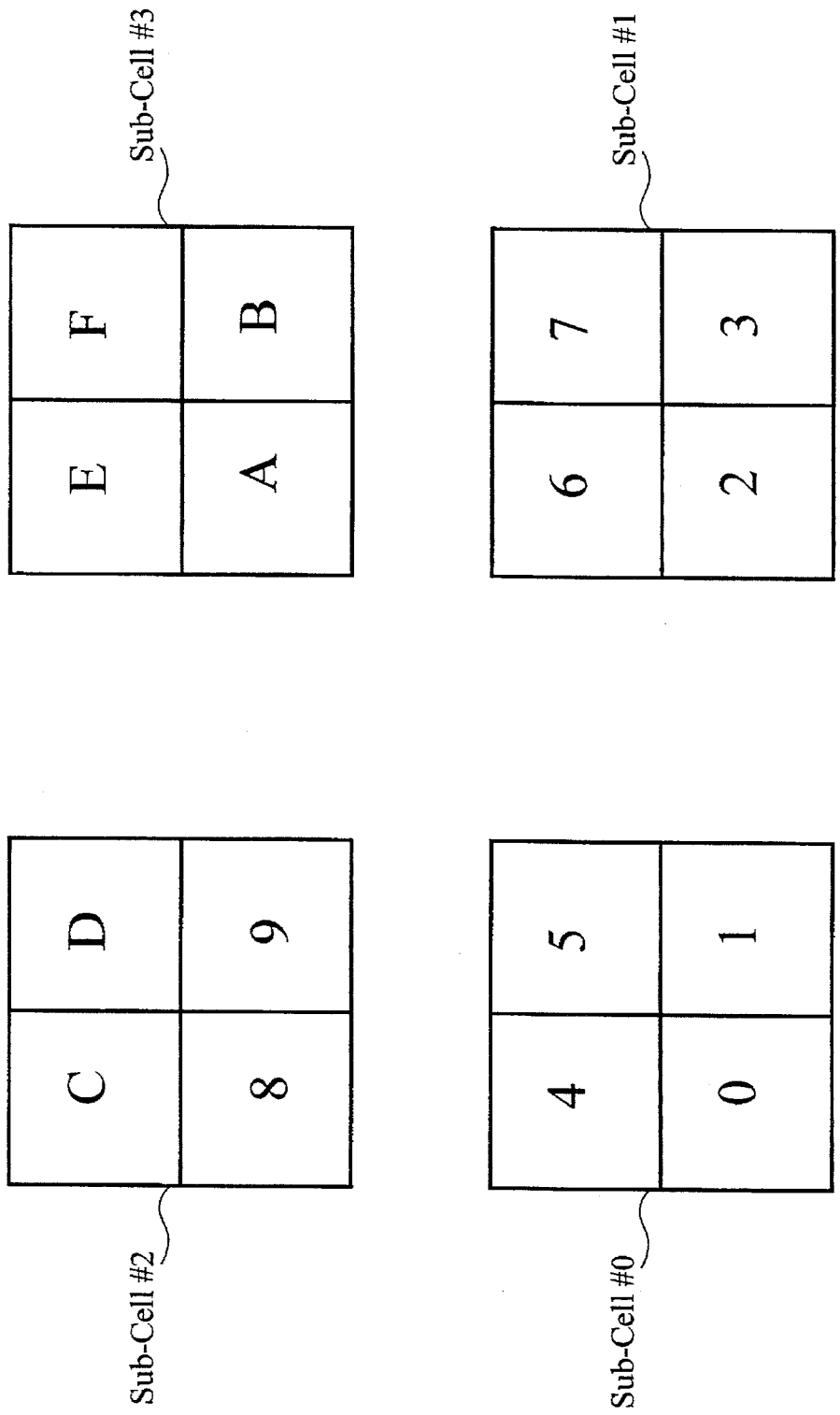
FIG. 19 illustrates the sequencing of sub-cells used by the preferred embodiment when eight-color cell compression is used.

The encoding of the cell as an eight-color cell (see step 114 in FIG. 12) is performed by executing the steps shown in FIG. 5. These steps divide the cell into four two-by-two sub-cells, as shown in FIG. 19. The sub-cells are then separately compressed as two-color cells by performing the steps shown in FIG. 5. When an eight-bit format for the output is selected, the resulting compressed color data assumes a format like that shown in FIG. 20a. In particular, a normalized sixteen-bit bit mask 166 is produced, wherein a "1" is stored in bit positions fifteen and thirteen. For each respective sub-cell, an eight-bit encoding of the color for "1" values in the bit mask and an eight-bit encoding of the color for "0" values in the bit mask follows. Specifically, the encoding 168 encodes the color for "1" values for sub-cell #0; the encoding 170 encodes the color for "0" values for sub-cell #0; the encoding 172 encodes the color for "1" values for sub-cell #1; the encoding 174 encodes the color for "0" values for sub-cell #1; the encoding 176 encodes the color for "1" values for sub-cell #2; the encoding 178 encodes the color for "0" values for sub-cell #2; the encoding 180 encodes the color for "1" values for sub-cell #3; and the encoding 182 encodes the color for "0" values for sub-cell #3.

Figure 20A:
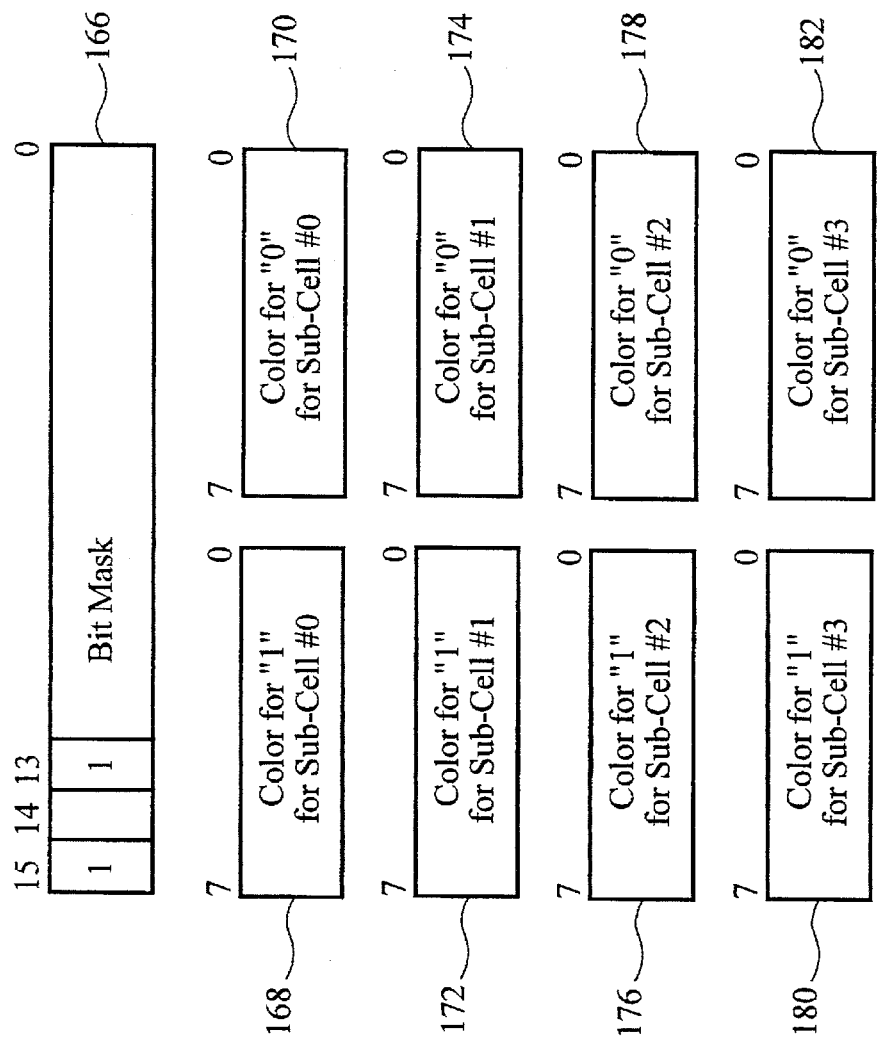
FIG. 20a illustrates the eight-bit format compressed color data produced by the preferred embodiment for an eight-color cell.
Figure 20B:
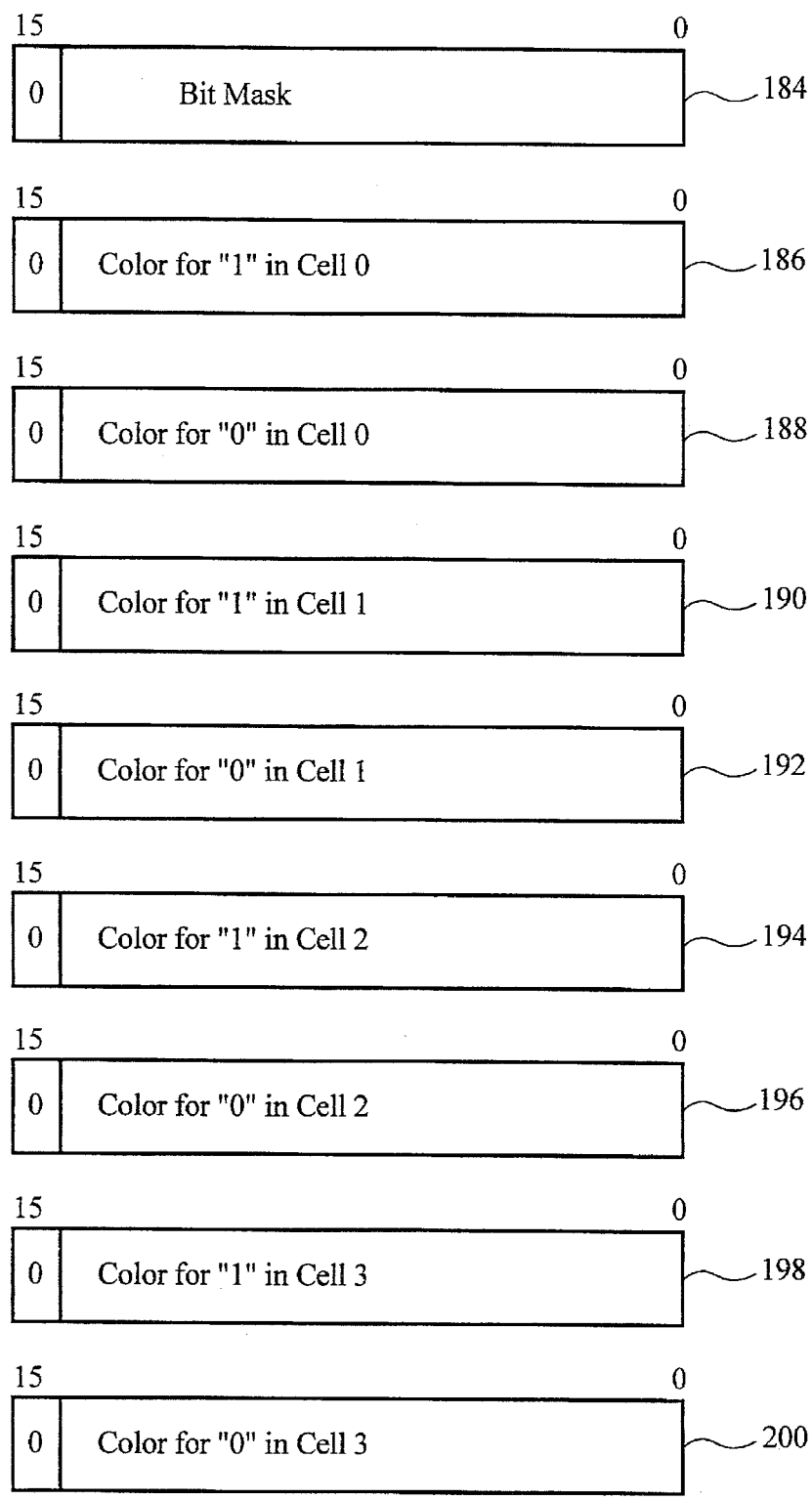
FIG. 20b illustrates the sixteen-bit format compressed color data produced by the preferred embodiment for an eight-color cell.

When a sixteen-bit format is selected and the cell is an eight-color cell, the compressed color data is similar to that shown in FIG. 20a, but the colors are encoded in a sixteen-bit format rather than an eight-bit format. Thus, as shown in FIG. 20b, sixteen-bit encodings 186, 188, 190, 192, 194, 196, 198 and 200 encode the colors for the respective cells. The first bit (i.e., bit fifteen) of each of the encodings is set as "0". A sixteen-bit bit mask 184 is provided to specify which colors of the pixels is assigned.

Figure 21A:
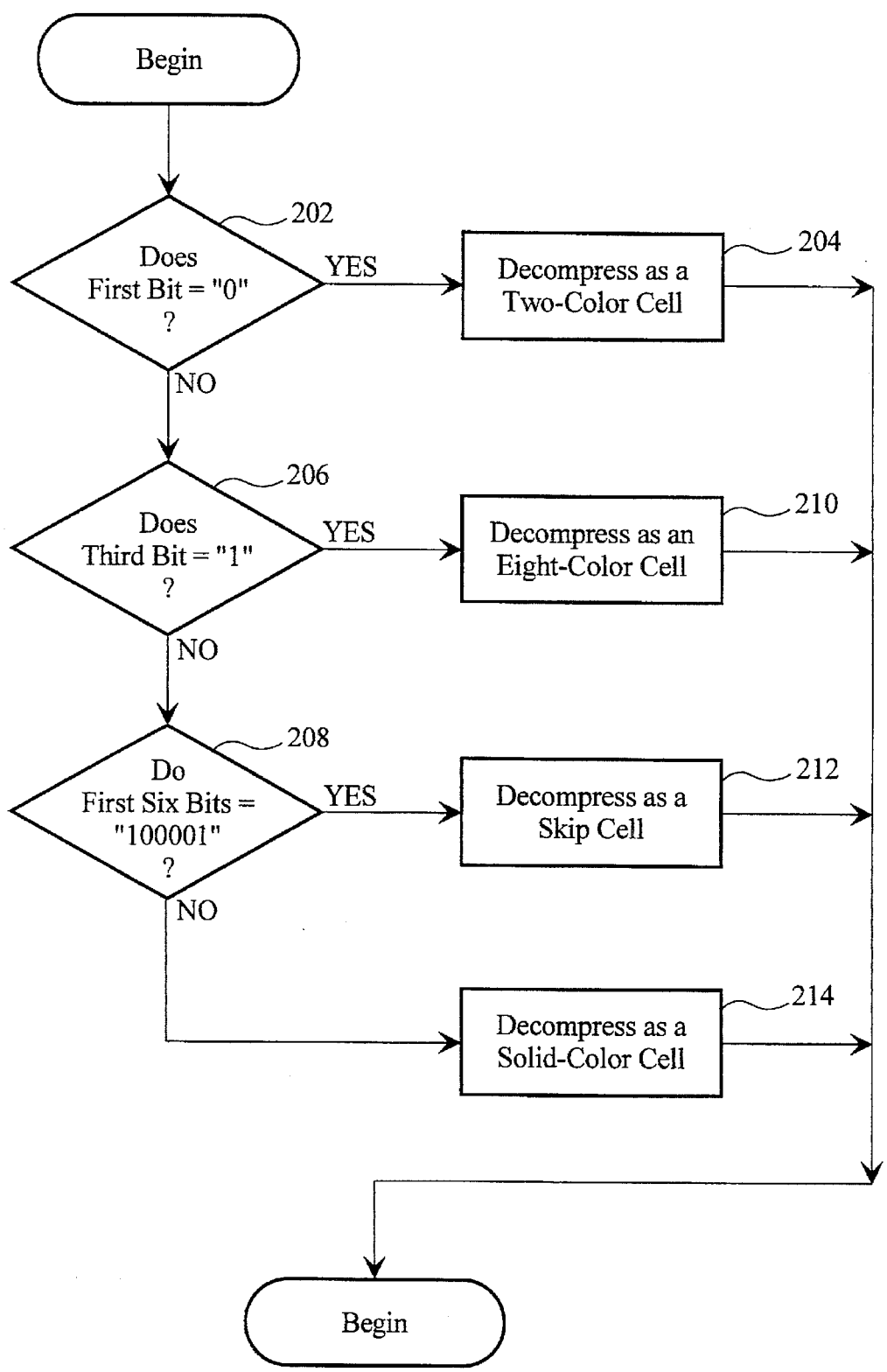
FIG. 21a is a flowchart illustrating the steps performed in decompressing eight-bit format compressed color data in accordance with another aspect of the preferred embodiment described herein.

In accordance with another aspect of the preferred embodiment of the present invention described herein, data may be decompressed from the eight-bit compressed format or the sixteen-bit compressed format that is produced by the above-described compression technique. The steps performed in decompressing digital video data in an eight-bit format are shown in the flowchart of FIG. 21a. The leading bits of a first word of information in a block of compressed color data specify how the cell was compressed. Once it is known how the cell was compressed, the cell may be decompressed accordingly. Decompression begins by examining the first bit in the first word of a block of compressed color data (step 202). If the first bit equals "0", the cell has been compressed as a two-color cell. Therefore, the cell is decompressed as a two-color cell (step 204) by assigning the color encoded in encoding 156 (FIG. 18a) for "1" values in the bit mask 154 to each pixel with "1" in the bit mask 154. Analogously, each bit with a value of "0" in the bit mask 154 is assigned the encoded color for "0" value that is encoded by encoding 158.

Next, in decompressing data in the eight-bit format, a determination is made whether the third bit in the first word of the block of compressed color data equals "1" (step 206 in FIG. 21a). From step 202, it is already known that the first bit equals "1". If both the third bit and the first bit equal "1", the cell has been compressed as an eight-color cell. The cell is, hence, decompressed as an eight-color cell (step 210). Specifically, the pixels in sub-cell #0 (see FIG. 19) are assigned either the color for "1" that is encoded by encoding 168 (FIG. 20a) or the color for "0" that is encoded by encoding 170, based upon the value of the corresponding bits in the bit mask 166. Similarly, the pixels in sub-cells #1, #2 and #3 (see FIG. 19) are assigned the colors encoded by encodings 172, 174, 176, 178, 180 and 182, as specified by the bits in the bit mask 166 (FIG. 20a).

If the first bit in the data block is a "1" and the third bit is "0", a determination is made whether the first six bits equal "100001" (step 208 in FIG. 21a). If the first six bits of the first word of a data block equal "100001", the cell is a skip cell. The compressed data word is decompressed (step 212) by generating decompressed color data for the number of "skipped cells" that is encoded in the compressed color data (see data word 128 of FIG. 14). The decompressed color data is set to be equal to that of the cell in the previous frame that corresponds with the skip-cell compressed color data.

Lastly, if none of the other tests (i.e., steps 202, 206 and 208) have been met, the cell must be compressed as a solid-color cell. Hence, the cell is decompressed as a solid-color cell (step 214). In decompressing the cell as a solid-color cell, each cell is assigned the average color encoded in encoding 142 (FIG. 16a) the compressed color data.

Figure 21B:
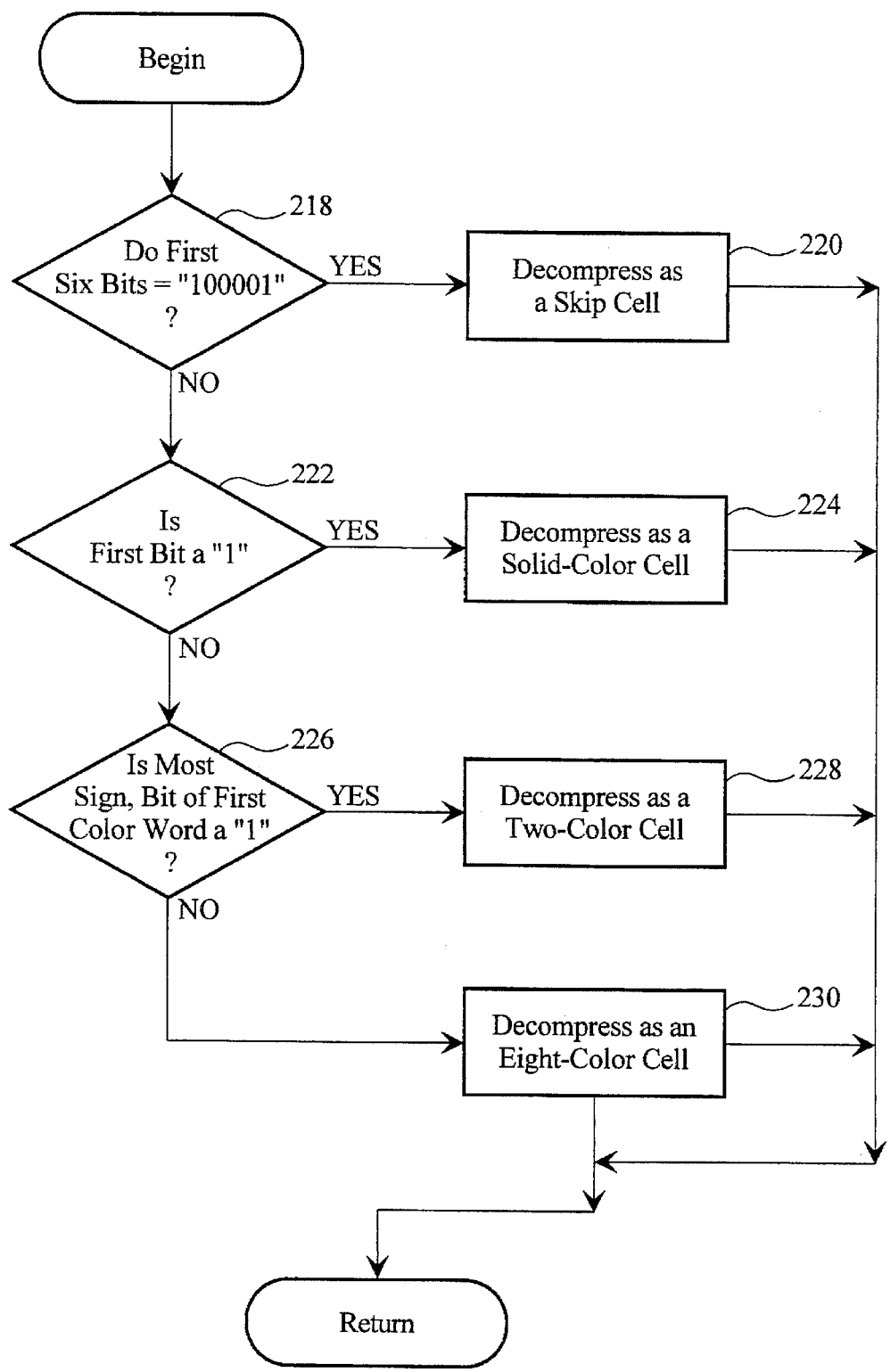
FIG. 21b is a flowchart illustrating the steps performed in decompressing compressed color data in a sixteen-bit format in accordance with another aspect of the preferred embodiment described herein.

FIG. 21b shows a flowchart of the steps performed when decompressing digital video data that has been compressed in a sixteen-bit format. In step 218, a determination is made whether the first six bits of the first word of the data block equal "100001". If the first six bits equal this value, the cell is decompressed as a skip cell (step 220). Decompression of a skip cell is performed in a fashion that is analogous to the decompression in the eight-bit format that is described above. In accordance with this decompression approach, a determination is next made whether the first bit has a value of "1" (step 222). If the first bit has a value of "1", the cell is decompressed as a solid-color cell (step 224). The decompression is analogous to the decompression performed with compressed color data in an eight-bit format, except that the compressed color data is in a sixteen-bit format.

In step 226, it is checked whether the most significant bit of the first color word following the bitmap in the compressed color data has a value of "1". If the most significant bit of the first color word has a value of "1", the cell is decompressed as a two-color cell in a fashion analogous to the approach described above for compressed color data in an eight-bit format (step 228). Lastly, if the most significant bit of the first color word is a "0" instead of a "1" the cell is decompressed as an eight-color cell in a fashion analogous to the above-described approach for an eight-bit format (step 230).

While the present invention has been described with reference to a preferred embodiment thereof, those skilled in the art will appreciate that various changes in form and scope may be made without departing from the spirit of the present invention as defined in the appended claims.

I claim:

1. A computer-readable storage medium for use in a data processing system, said medium holding instructions for performing a method of compressing color data for pixels in a first cell of a frame of color data to produce compressed color data, said method comprising the steps of:

a) for each pixel in the first cell, comparing the color data for the pixel in the first cell with color data for a pixel in a second cell of pixels in a previous frame of color data to determine whether the color data in the first cell and the color data in the second cell are substantially the same;

b) if the color data in the first cell is substantially the same as the color data for the second cell, producing the compressed color data by encoding the color data for the pixels of the first cell as a duplicate of the color data for the pixels of the second cell;

c) if the compressed color data for the first cell has not been produced by the preceding steps, producing the compressed color data by performing the following steps:

(i) calculating the luminanee of each of the pixels in the first cell;

(ii) dividing the pixels in the first cell into a set of brighter pixels and a set of dimmer pixels, based on the calculated luminances;

(iii) calculating an average color of pixels in the set of brighter pixels and calculating an average color of pixels in the set of dimmer pixels;

(iv) assigning the average color of pixels in the set of brighter pixels to each of the pixels in the set of brighter pixels; and (v) assigning the average color of pixels in the set of dimmer pixels to each of the pixels in the dimmer set of pixels.

2. The computer-readable storage medium of claim 1 further including instructions for performing the steps of:

after producing the compressed color data by encoding the color data for the pixels of the first cell as a duplicate of the color data for the pixels of the second cell, determining whether all of the pixels in the first cell have color data of substantially the same color;

if all of the pixels in the first cell have color data of substantially the same color, producing the compressed color data by encoding the first cell as a cell of the same color pixels; and if all of the pixels in the first cell do not have color data of substantially the same color, producing the compressed color data by performing the following steps:

(i) calculating the luminance of each of the pixels in the first cell;

(ii) dividing the pixels in the first cell into a set of brighter pixels and a set of dimmer pixels, based on the calculated luminances;

(iii) calculating an average color of pixels in the set of brighter pixels and calculating an average color of pixels in the set of dimmer pixels;

(iv) assigning the average color of pixels in the set of brighter pixels to each of the pixels in the set of brighter pixels; and (v) assigning the average color of pixels in the set of dimmer pixels to each of the pixels in the dimmer set of pixels.

3. The computer-readable storage medium of claim 2 wherein the step of producing the compressed color data by encoding the first cell as a cell of the same color pixels further comprises the step of:

producing the compressed color data such that the compressed color data includes fixed bit values that specify that the first cell is a cell of the same color pixels and further includes an encoding of the average color of the pixels in the first cell.

4. The computer-readable storage medium of claim 2 wherein the step of determining whether all of the pixels in the first cell have color data of substantially the same color further comprises the steps of:

calculating an average color of the pixels of the first cell;

creating color data for a third cell in which each pixel has color data equal to the calculated average color of the pixels in the first cell;

comparing the color data of each pixel in the first cell with the color data of a corresponding pixel in the third cell to produce a total difference in color between pixels of the first cell and the third cell;

determining whether the total difference is less than a first threshold; and if the total difference is less than the first threshold, determining that all of the pixels in the first cell have color data of substantially the same color.

5. The computer-readable storage medium of claim 4 wherein the medium further holds instructions for performing the steps of:

setting a desired quality level for the compressed color data; and calculating the first threshold as a value that is inversely proportional to the desired quality level.

6. The computer-readable storage medium of claim 5 wherein the medium further holds instructions for performing the steps of:

changing the desired quality level to a new quality level; and recalculating the first threshold as a value that is inversely proportional to the new quality level.

7. The computer-readable storage medium of claim 1 wherein the medium further holds instructions for performing the steps of:

after step b):

(i) calculating an average color of pixels in the first cell;

(ii) creating color data for a third cell in which each pixel has color data equal to the calculated average color of pixels in the first cell;

(iii) comparing the color data of each pixel in the first cell with color data of a corresponding pixel in the third cell to produce a variance in color between the first cell and the third cell;

(iv) if the variance in color between the first cell and the third cell exceeds a second threshold:

dividing the first cell into sub-cells, each sub-cell comprising a subset of the pixels of the first cell;

for each sub-cell, dividing the pixels of the sub-cell into a set of brighter pixels and a set of dimmer pixels;

calculating an average color of pixels in the set of brighter pixels and calculating an average color of pixels in the set of dimmer pixels; and producing the compressed color data by assigning the average color of the set of brighter pixels to each pixel in the set of brighter pixels and assigning the average color of the set of dimmer pixels to each pixel in the set of dimmer pixels.

8. The computer-readable storage medium of claim 7 wherein the medium further holds instructions for performing the steps of:

selecting a desired quality level for compression; and calculating the second threshold as a value that is inversely proportional to the desired quality level.

9. The computer-readable storage medium of claim 8 further including instructions for performing the steps of:

changing the desired quality level to a new quality level; and recalculating the second threshold as a value that is inversely proportional to the new quality level.

10. The computer-readable storage medium of claim 1 wherein the compressed color data is in an eight-bit format.

11. The computer-readable storage medium of claim 1 wherein the compressed color data is in a sixteen-bit format.

12. A computer-readable storage medium for use in a data processing system, said medium holding instructions for performing a method of compressing color data for pixels in a first cell of a frame of color data to produce compressed color data, said method comprising the steps of:

a) for each pixel in the first cell, comparing the color data for the pixel in the first cell with color data for a pixel in a second cell of pixels in a previous frame of color data to determine a variance in color between the first cell and the second cell, and using the variance in color between the first cell and the second cell to determine whether the color data in the first cell and the color data in the second cell are substantially the same;

b) if the color data in the first cell is substantially the same as the color data in the second cell, producing the compressed color data by encoding the color data for the pixels of the first cell as a duplicate of the color data for the pixels of the second cell;

c) if the color data in the first cell is not substantially the same as the color data in the second cell:

(i) calculating an average color of pixels in the first cell;

(ii) creating color data for a third cell in which each pixel has color data equal to the calculated average color of pixels in the first cell;

(iii) comparing the color data of each pixel in the first cell with color data of a corresponding pixel in the third cell to produce a variance in color between the first cell and the third cell;

(iv) based on the variance in color between the first cell and the third cell, determining whether all of the pixels in the first cell have color data of substantially the same color;

d) if all of the pixels in the first cell have color data of substantially the same color, producing the compressed color data by encoding the first cell as a cell of the same color;

e) calculating luminances of pixels in the first cell;

f) if the variance in color between the first cell and the third cell is less than a first threshold, producing the compressed color data by encoding color data for each of the pixels in the first cell as having one of two colors; and g) if the variance in color between the first cell and the third cell is greater than the first threshold:

(i) dividing the first cell into sub-cells of pixels, wherein each sub-cell is a subset of the first cell; and (ii) for each sub-cell, producing the compressed color data by encoding each pixel as one of two colors, whereby the two colors used in encoding pixels differ between at least two of the sub-cells.

13. The computer-readable storage medium of claim 12 wherein the step of producing the compressed color data by encoding the first cell as a cell of the same color further comprises the step of:

producing the compressed color data such that the compressed color data includes fixed bit values that specify that the pixels of the first cell are all substantially the same color and further includes an encoding of the average color of the pixels in the first cell.

14. The computer-readable storage medium of claim 12 wherein the step of determining whether all of the pixels in the first cell have color data of substantially the same color further comprises the steps of:

determining whether the variance in color between the first cell and the third cell is less than a second threshold; and if the variance in color between the first cell and the third cell is less than the first threshold, determining that all of the pixels in the second cell have color data of substantially the same color.

15. The computer-readable storage medium of claim 12 further holding instructions for performing the steps of:

setting a desired quality level for the compressed color data; and calculating the first threshold as a value that is inversely proportional to the desired quality level.

16. The computer-readable storage medium of claim 15 further holding instructions for performing the steps of:

changing the desired quality level to a new quality level; and recalculating the first threshold as a value that is inversely proportional to the new quality level.

17. The computer-readable storage medium of claim 12 wherein the compressed color data is in an eight-bit format.

18. The computer-readable storage medium of claim 12 wherein the compressed color data is in a sixteen-bit format.

19. The computer-readable storage medium of claim 12 wherein the step of producing the compressed color data by encoding color data for each of the pixels as having one color selected from a group of two colors, further comprises the steps of:

dividing the pixels in the first cell into a set of brighter pixels and a set of dimmer pixels based on the calculated luminances;

calculating an average color of pixels in the set of brighter pixels and calculating an average color of pixels in the set of dimmer pixels;

assigning the average color of pixels in the set of brighter pixels to each of the pixels in the set of brighter pixels; and assigning the average colors of pixels in the set of dimmer pixels to each of the pixels in the set of dimmer pixels.

20. The computer-readable storage medium of claim 12 wherein the step of, for each sub-cell, producing the compressed color data by encoding each pixel as the two colors further comprises the steps of:

dividing the pixels of the sub-cell into a set of brighter pixels and a set of dimmer pixels, based on the calculated luminances;

calculating an average color of pixels in the set of brighter pixels and calculating an average color of pixels in the set of dimmer pixels; and producing the compressed color data by assigning the average color of the set of brighter pixels to each pixel in the set of brighter pixels and assigning the average color of the set of dimmer pixels to each pixel in the set of dimmer pixels.

* * * * *

UNITED STATES PATENT AND TRADEMARK OFFICE
CERTIFICATE OF CORRECTION

PATENT NO. : 5,668,932
DATED : September 16, 1997
INVENTOR(S) : Stuart T. Laney

It is certified that error appears in the above-identified patent and that said Letters Patent is hereby corrected as shown below:

In column 12, claim 1, line 16, following "the" please delete "luminanee", and insert therefor -- luminance --.

Signed and Sealed this

Sixteenth Day of December, 1997

Attest:

BRUCE LEHMAN

Attesting Officer

Commissioner of Patents and Trademarks